United States Patent [19]
Hoffert et al.

[11] Patent Number: 5,903,892
[45] Date of Patent: May 11, 1999

[54] INDEXING OF MEDIA CONTENT ON A NETWORK

[75] Inventors: Eric M. Hoffert, San Francisco; Karl Cremin, Mountain View, both of Calif.; Adnan Ali, London, Canada; Stephen R. Smoot, San Francisco, Calif.

[73] Assignee: Magnifi, Inc., Cupertino, Calif.

[21] Appl. No.: 08/847,158

[22] Filed: Apr. 30, 1997

Related U.S. Application Data

[60] Provisional application No. 60/018,312, May 24, 1996, provisional application No. 60/018,311, May 24, 1996, provisional application No. 60/018,238, May 24, 1996, provisional application No. 60/021,452, Jul. 10, 1996, provisional application No. 60/021,515, Jul. 10, 1996, provisional application No. 60/021,517, Jul. 10, 1996, provisional application No. 60/021,466, Jul. 10, 1996, provisional application No. 60/023,634, Aug. 9, 1996, provisional application No. 60/023,633, Aug. 9, 1996, and provisional application No. 60/023,836, Aug. 12, 1996.

[51] Int. Cl.⁶ ..................................................... G06F 17/30
[52] U.S. Cl. .............................. 707/10; 707/2; 707/104; 345/327
[58] Field of Search ............................... 707/10, 103, 2; 345/327

[56] References Cited

U.S. PATENT DOCUMENTS

| | | | |
|---|---|---|---|
| 5,617,119 | 4/1997 | Briggs et al. | 707/100 |
| 5,677,708 | 10/1997 | Matthews, III et al. | 345/115 |
| 5,687,331 | 11/1997 | Volk et al. | 345/327 |
| 5,713,021 | 1/1998 | Kondo et al. | 707/103 |
| 5,729,741 | 3/1998 | Liaguno et al. | 707/104 |
| 5,737,619 | 4/1998 | Judson | 707/500 |
| 5,742,816 | 4/1998 | Barr et al. | 707/104 |
| 5,797,008 | 8/1998 | Burrows | 1/1 |

OTHER PUBLICATIONS

"Informedia (tm) Digital Video Library: Integrated Speech, Image and language Understanding for Creation and Exploration of Digital Libraries," Carnegie Mellon University, Nov. 1994.

*Primary Examiner*—Paul R. Lintz
*Assistant Examiner*—Ella Colbert
*Attorney, Agent, or Firm*—Blakely, Sokoloff, Taylor & Zafman,LLP

[57] ABSTRACT

A method and apparatus for searching for multimedia files in a distributed database and for displaying results of the search based on the context and content of the multimedia files.

15 Claims, 17 Drawing Sheets

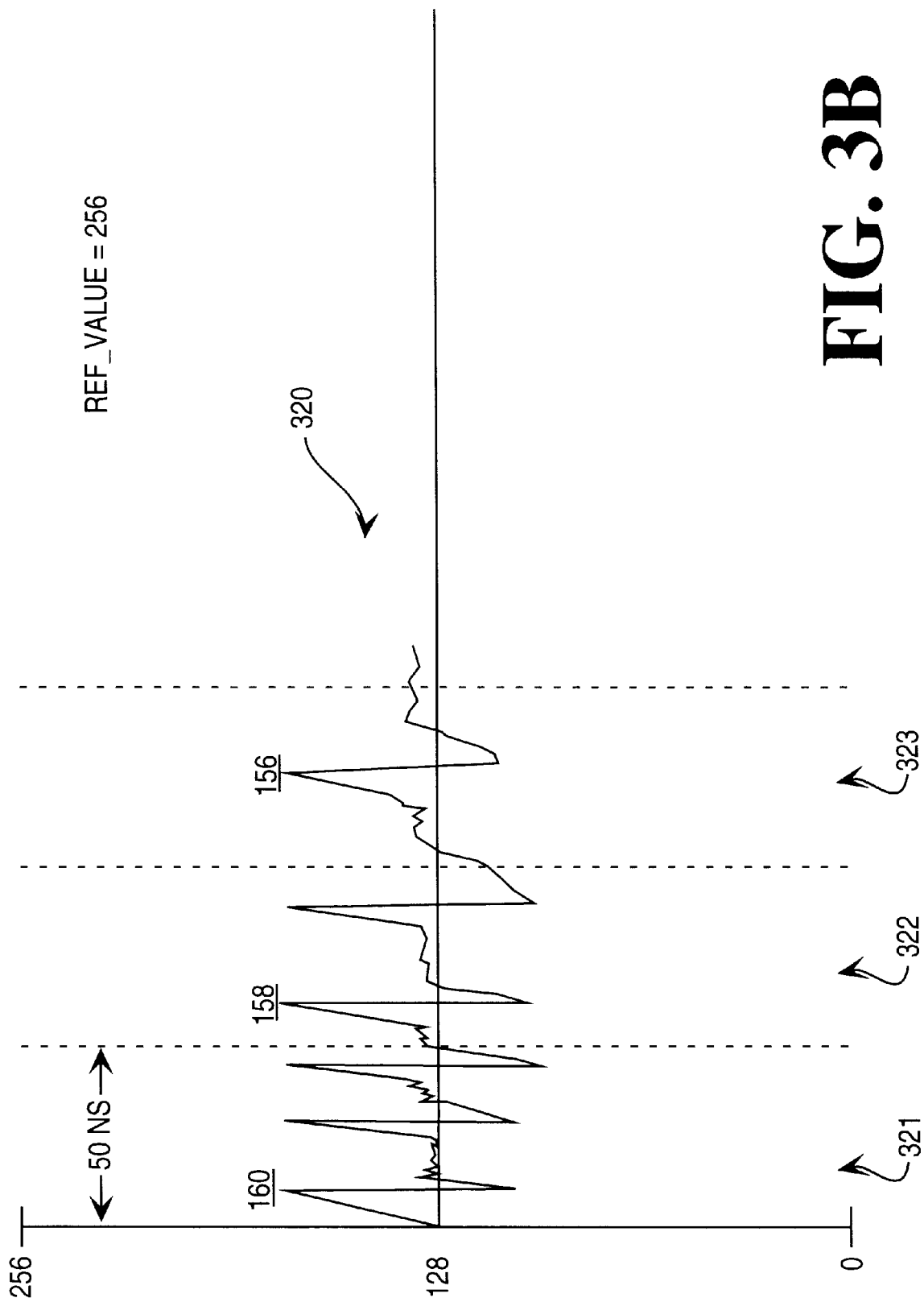

INDEXING OF MEDIA CONTENT ON A NETWORK

BACKGROUND OF THE INVENTION

Related Applications

This application claims benefit of the following co-pending U.S. Provisional Applications:

1) Method and Apparatus for Processing Context and Content of Multimedia Files When Creating Searchable Indices of Multimedia Content on Large, Distributed Networks; Ser. No.: 60/018,312; Filed: May 24, 1996, now abandoned;
2) Method and Apparatus for Display of Results of a Search Queries for Multimedia Files; Ser. No.: 60/018, 311; Filed: May 24, 1996, now abandoned;
3) Method for Increasing Overall Performance of Obtaining Search Results When Searching on a Large, Distributed Database By Prioritizing Database Segments to be Searched; Ser. No.: 60/018,238, Filed: May 24, 1996, now abandoned;
4) Method for Processing Audio Files to Compute Estimates of Music-Speech Content and Volume Levels to Enable Enhanced Searching of Multimedia Databases; Ser. No.: 60/021,452; Filed: Jul. 10, 1996, now abandoned;
5) Method for Searching for Copyrighted Works on Large, Distributed Networks; Ser. No.: 60/021,515; Filed: Jul. 10, 1996, now abandoned;
6) Method for Processing Video Files to Compute Estimates of Motion Content, Brightness, Contrast and Color to Enable Enhanced Searching of Multimedia Databases; Ser. No.: 60/021,517; Filed: Jul. 10, 1996, now abandoned;
7) Method and Apparatus for Displaying Results of Search Queries for Multimedia Files; Ser. No.: 60/021, 466; Filed: Jul. 10, 1996, now abandoned;
8) A Method for Indexing Stored Streaming Multimedia Content When Creating Searchable Indices of Multimedia Content on Large, Distributed Networks; Ser. No.: 60/023,634; Filed: Aug. 19, 1996, now abandoned;
9) An Algorithm for Exploiting Lexical Proximity When Performing Searches of Multimedia Content on Large, Distributed Networks; Ser. No.: 60/023,633; Filed: Aug. 9, 1996, now abandoned;
10) A Method for Synthesizing Descriptive Summaries of Media Content When Creating Searchable Indices of Multimedia Content on Large, Distributed Networks; Ser. No.: 60/023,836; Filed: Aug. 12, 1996, now abandoned.

FIELD OF THE INVENTION

The present invention relates to the field of networking, specifically to the field of searching for and retrieval of information on a network.

Description of the Related Art

Wouldn't it be nice to be able to log onto your local internet service provider, access the worldwide web, and search for some simple information, like "Please find me action movies with John Wayne which are in color?" or "Please find me audio files of Madonna talking?", or "I would like black and white photos of the Kennedy assassination". Or, how about even "Please find me an action movie starring Michael Douglas and show me a preview of portions of the movie where he is speaking loudly". Perhaps, instead of searching the entire worldwide web, a company may want to implement this searching capability on its intranet.

Unfortunately, text based search algorithms cannot answer such queries. Yet, text based search tools are the predominate search tools available on the internet today. Even if text based search algorithms are enhanced to examine files for file type and, therefore, be able to detect whether a file is a audio, video or other multimedia file, little if any information is available about the content of the file beyond its file type.

Still further, what if the search returns a number of files. Which one is right? Can the user tell from looking at the title of the document or some brief text contained in the document as is done by many present day search engines? In the case of relatively small text files, downloading one or two or three "wrong" files, when searching for the right file, is not a major problem. However, when downloading relatively large multimedia files, it may be problematic to download the files without having a degree of assurance that the correct file has been found.

SUMMARY OF THE INVENTION

It is desireable to provide a search engine which is capable of searching the internet, or other large distributed network for multimedia information. It is also desirable that the search engine provide for analysis of the content of files found in the search and for display of previews of the information.

BRIEF DESCRIPTION OF THE DRAWINGS

FIGS. 3B, 3C and 3D illustrates waveforms.

Figure 1:
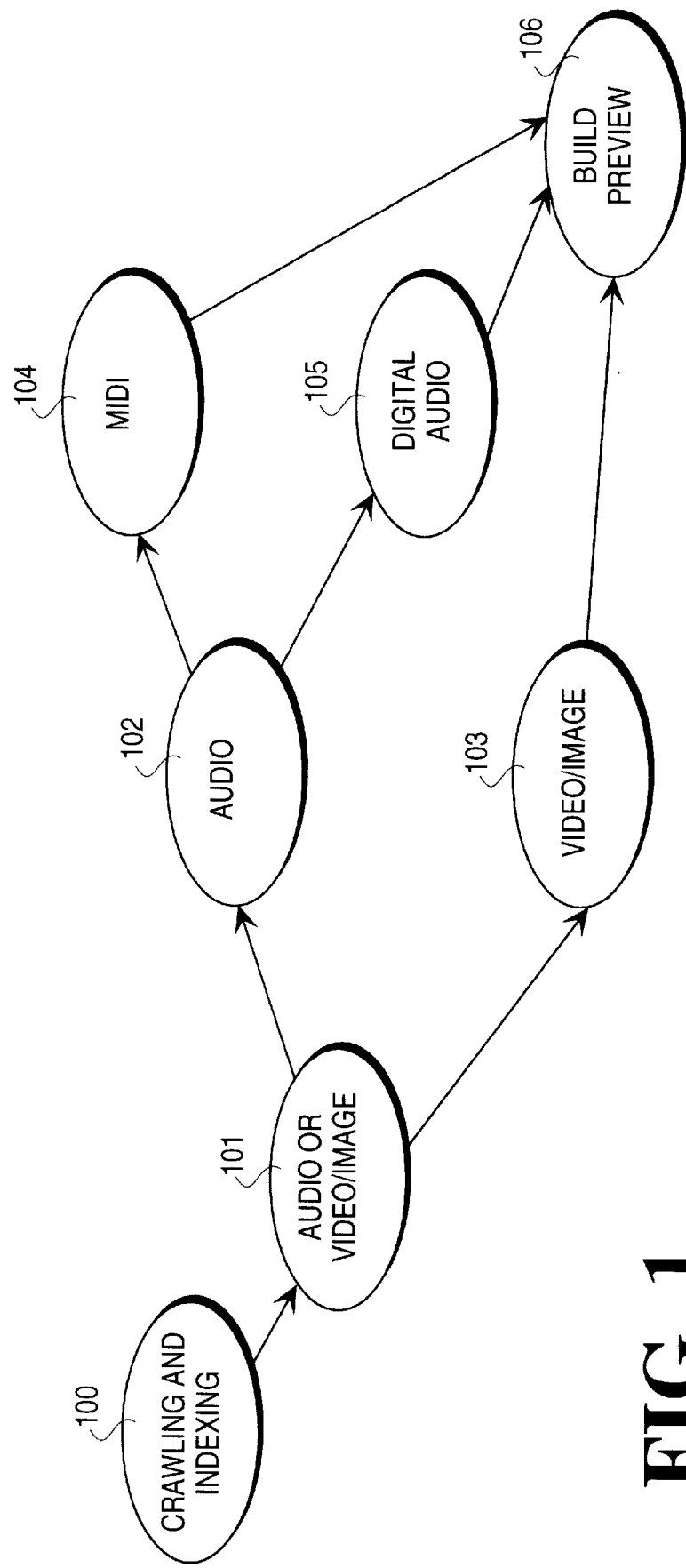
FIG. 1 illustrates an overall diagram of a media search and retrieval system as may implement the present inventions.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS

What is described herein is a method and apparatus for searching for, indexing and retrieving information in a large, distributed network.

1.0 Overview

FIG. 1 provides an overview of a system implementing various aspects of the present invention. As was stated above, it is desirable to be provide a system which will allow searching of media files on a distributed network such as the internet or, alternatively, on intranets. It would be desirable if such a system were capable of crawling the network, indexing media files, examining and analyzing the media file's content, and presenting summaries to users of the system of the content of the media files to assist the user in selection of a desired media file.

The embodiment described herein may be broken down into 3 key components: (1) crawling and indexing of the network to discover multimedia files and to index them 100; (2) examining the media files for content (101–105); and (3) building previews which allow a user to easily identify media objects of interest 106. Each of these phases of the embodiment provide, as will be appreciated, for unique methods and apparatus for allowing advanced media queries.

2.0 Media Crawling and Indexina

Figure 2A:
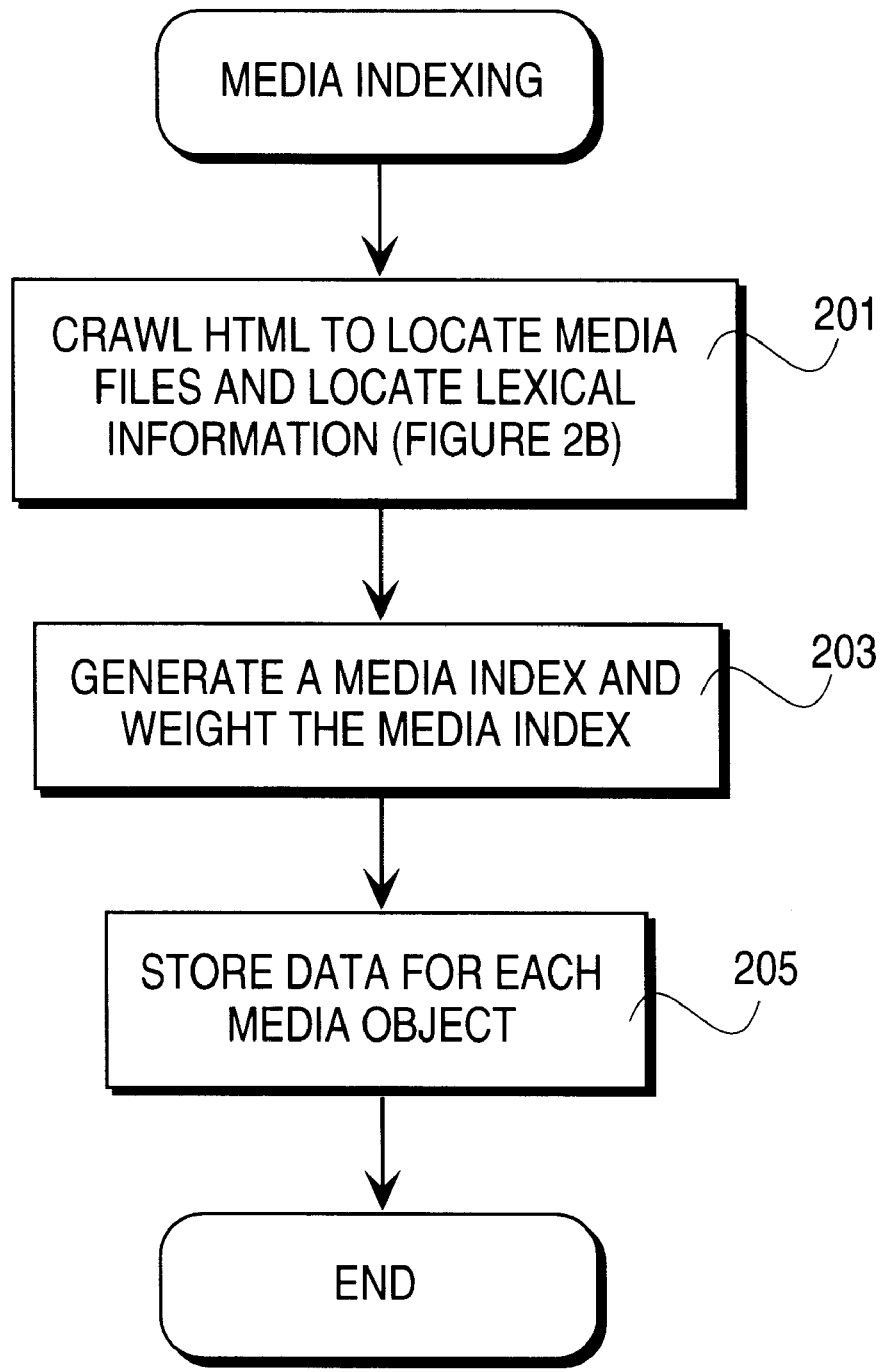
FIGS. 2A–C illustrates a flow diagram of a method of media crawling and indexing as may utilize the present inventions.
Figure 2B:
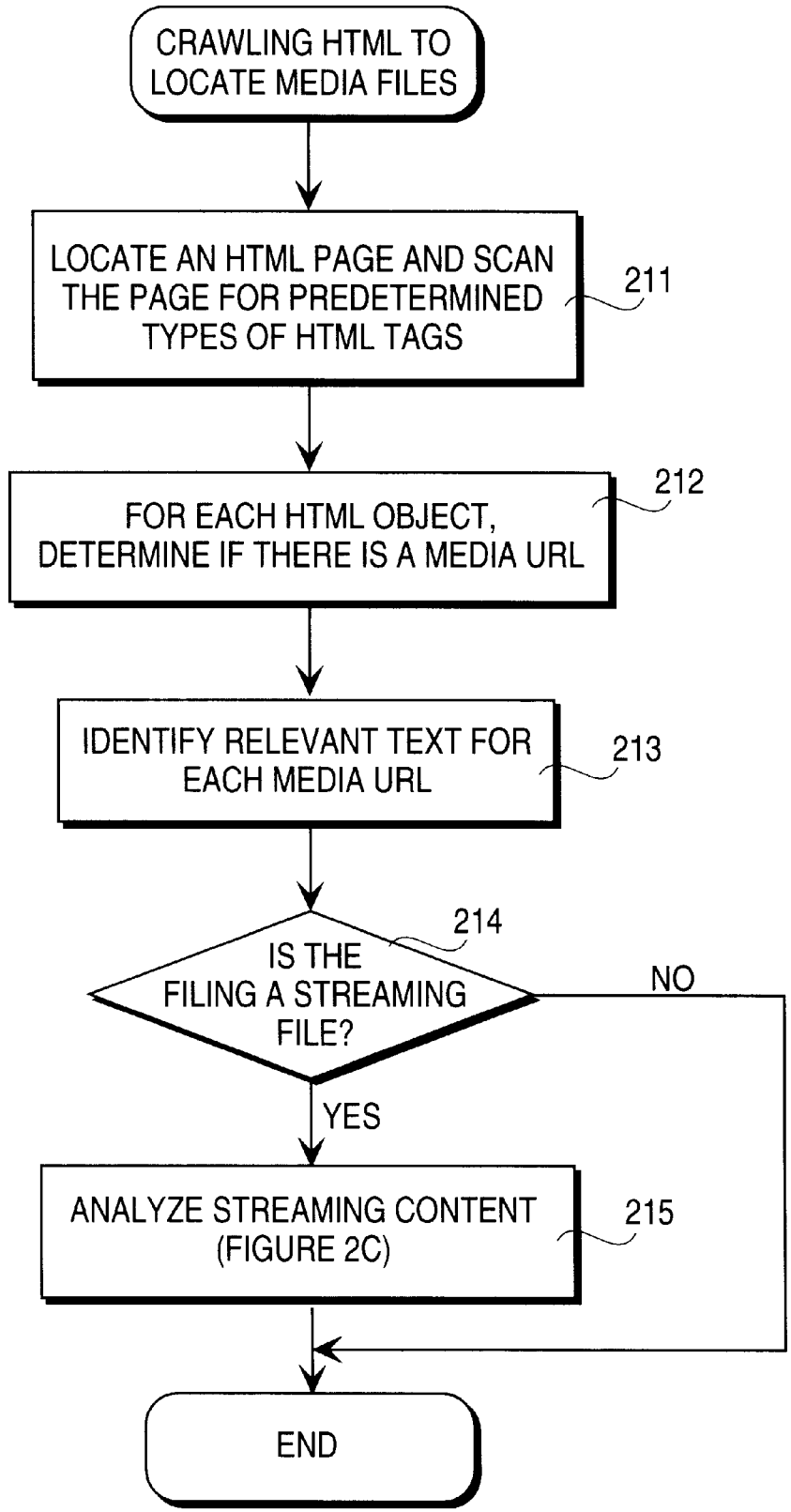
Figure 2C:
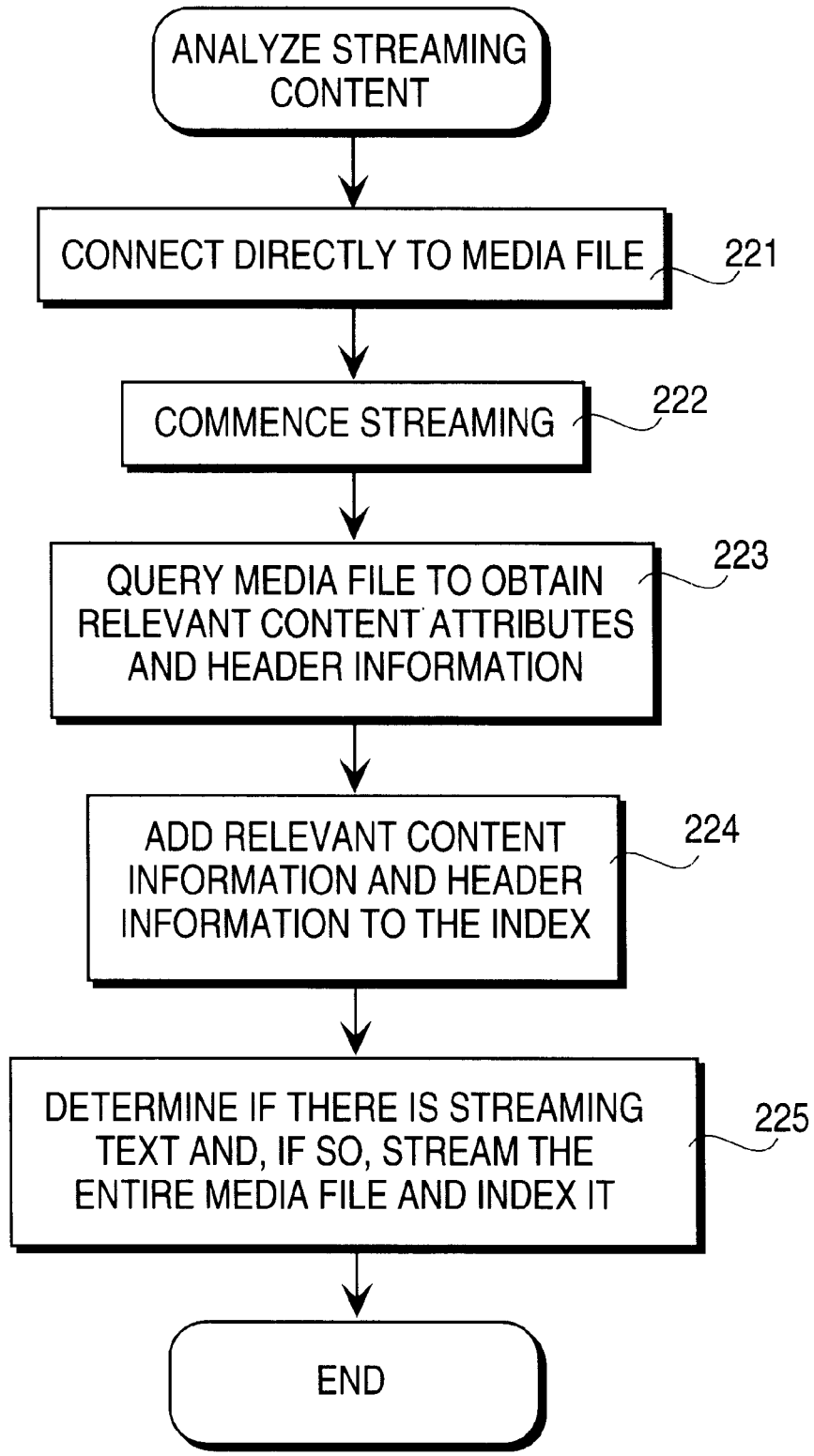

FIGS. 2A–2C provides a description of a method for crawling and indexing a network to identify and index media files. Hypertext markup language (HTML) in the network is crawled to locate media files, block 201. Lexical information (i.e., textual descriptions) is located describing the media files, block 202 and a media index is generated, block 203. The media index is then weighted, block 204 and data is stored for each media object, block 205. Each of these steps will be described in greater detail below.

2.1 Crawl HTML to locate media files

The method of the described embodiment for crawling HTML to locate media files is illustrated in greater detail by FIG. 2B. Generally, a process as used by the present invention may be described as follows:

The crawler starts with a seed of multimedia specific URL sites to begin its search. Each seed site is handled by a separate thread for use in a multithreaded environment. Each thread parses HTML pages (using a tokenizer with lexical analysis) and follows outgoing links from a page to search for new references to media files. Outgoing links from an HTML page are either absolute or relative references. Relative references are concatenated with the base URL to generate an absolute pathname. Each new page which is parsed is searched for media file references. When a new site is found by the crawler, there is a check against the internal database to ensure that the site has not already been visited (within a small period of time); this guarantees that the crawler only indexes unique sites within its database, and does not index the same site repeatably. A hash table scheme is used to guarantee that only unique new URLs are added to the database. The URL of a link is mapped into a single bit in a storage area which can contain up to approximately ten million URLs. If any URL link which is found hashes to the same bit position, then the URL is not added to the list of URLs for processing. As the crawler crawls the web, those pages which contain media references receive a higher priority for processing than those pages which do not reference media. As a result, pages linked to media specific pages will be visited by the crawler first in an attempt to index media related pages more quickly than through conventional crawler techniques.

When entering a new site, the crawler scans for a robot exclusion protocol file. If the file is present, it indicates those directories which should not be scanned for information. The crawler will not index material which is disallowed by the optional robot exclusion file. On a per directory basis, there is proposed to be stored a media description file (termed for purposes of this application the mediaX file).

The general format of this file for the described embodiment is provided at the end of the Specification. This file contains a series of records of textual information for each media file within the current directory. As will be discussed in greater detail below, the crawler scans for the media description file in each directory at a web site, and adds the text based information stored there into the index being created by the crawler. The mediaX file allows for storage of information such as additional keywords, abstract and classification data. Since the mediaX file is stored directly within the directory where the media file resides, it ensures an implicit authentication process whereby the content provider can enhance the searchable aspects of the multimedia information and can do so in a secure manner.

The crawler can be constrained to operate completely within a single parent URL. In this case, the user inputs a single URL corresponding to a single web site. The crawler will then only follow outgoing links which are relative to the base URL for the site. All absolute links will not be followed. By following only those links which are relative to the base URL, only those web pages which are within a single web site will be visited, resulting in a search and indexing pass of a single web site. This allows for the crawling and indexing of a single media-rich web site. Once a single web site has had an index created, then users may submit queries to find content located only at the web site of interest. This scheme will work for what is commonly referred to as "Intranet" sites, where a media-rich web site is located behind a corporate firewall, or for commercial web sites containing large multimedia datasets.

2.1.1 Scan page for predetermined HTML tag types

Each HTML page is scanned for predetermined types of HTML tags, block 211. In this embodiment, the following tags are scanned for:

tables (single row and multi-row)

lists (ordered and unordered)

headings java script client side image maps server side image maps header separators 2.1.2 Determine if there is a media URL If there is a media uniform resource locator (URL), block 212. If there is a media URL, then the media URL is located and stored. However, in the described embodiment, certain media URL's may be excluded. For example, an embodiment may choose not to index URLs having certain keywords in the URL, certain prefixes, certain suffixes or particular selected URLs.

2.1.3 Locating relevant lexical information

Next, relevant lexical information (text) is selected for each URL. Often a web page which references a media file provides significant description of the media file as textual information on the web page. When indexing a media file, the present invention has recognized that it would be useful to utilize this textual information. However, certain web pages may reference only a single media file, while other web pages may reference a plurality of media files. In addition, certain lexical information on the web page may be more relevant than other information to categorizing the media for later searching.

It has been observed that relevant textual information may be directly surrounding the media reference on a web page, or it may be far from the media reference. However, it has been found that more often than not, the relevant text is very close (in lexical distance) to the media reference. Therefore, the following general rules are applied when associating lexical information with a media file:

1) if the media file reference is found within a table, store the text within the table element as associated with the media file;
2) if the media file reference is found within a list, store the text within the list element as associated with the media file;
3) store the text in the heading as associated with the media file. In addition, in some embodiments, the text within higher level headings may also be stored.
4) if there is javascript, store the text associated with the javascript tag;
5) for client and server side image maps, if there is no relevant text, store only the URL. In addition, the image maps may be parsed to obtain all unique URLs and these may also be stored..

In some embodiments, a special tag may be stored within the indexed text where the media reference occurs in the web page. When queries are posed to the full-text database of the stored HTML pages which reference media, the distance of the keyword text from the media reference tag can be used to determine if there is a relevant match. The standard distance from media reference to matching keyword utilized is ten words in each direction outwards from the media reference. The word distance metric is called "lexical proximity". For standard web pages where text surrounding media is generally relevant this is an appropriate value.

If the results of a search using lexical proximity are not satisfactory to a user, the user needs a mechanism by which to broaden or narrow the search, based on the relevance which is found by the default lexical proximity. Users can employ an expand and narrow search button to change the default lexical proximity. The expand function will produce more and more search results for a given query, as the lexical proximity value is increased. A typical expand function will increase the lexical proximity value by a factor of two each time it is selected. When the expand function is used, more text will be examined which is located near the media reference to see if there is a keyword match. Expanding the search repeatedly will decrease precision and increase recall.

The narrow search button will do the reverse, by decreasing the lexical proximity value more and more. A typical narrow function will decrease the lexical proximity value by a factor of two each time it is selected. The narrow search button will reduce the number of search results, and hone in on that text information which only surrounds the media reference directly. Narrowing the search will increase precision and decrease recall. The relevance of all resulting queries should be quite high, on average, as a search is narrowed using this method.

When a database is limited in depth of entries, and is generated with a fixed lexical proximity value, a search query may often produce a search result list with zero hits. In order to increase the number of search results for the case of zero hits with fixed lexical proximity, a method is employed which will iterate on the lexical proximity value until a set of ten search results are returned. The algorithm is as follows:

perform the search query
look at the number of returned hits
 if the number of returned hits is less than ten, then perform a new search with the lexical proximity value doubled
continue the above process until ten search results are returned Users should be able to specify the usage of lexical proximity to enhance the indexing of their search material. For example, if the web page author knows that all words which are ten words in front of the media reference are valid and relevant, then the author should specify a lexical proximity value which is only negative ten (i.e., look only in the reverse direction from the media URL by ten words). If the web page author knows that all words which are ten words after the media reference are valid and relevant, then the author should specify a lexical proximity value which is only positive ten. Finally, if the web author knows that both ten words ahead, and ten words behind the media reference are relevant, then the lexical proximity value should be set to positive/negative ten. Similarly, if the web author knows that the entire page contains relevant text for a single media file, then the lexical proximity value should be set to include all text on a page as relevant.

In addition to the above-described processes for locating relevant lexical information, in the described embodiment, certain information is generally stored for all media URL's. In particular, the following information is stored:

the name of the media file
URL of the media file
text string which is associated with the media file anchor reference
title of the HTML document containing the media file
keywords associated with the HTML document
URL for the HTML document containing the media file reference
keywords embedded in the media file
textual annotations in the media file
script dialogue, closed captioning and lyric data in the media file
auxiliary data in the media file (copyright, author, producer, etc.)
auxiliary data located within the media reference in the HTML document
auxiliary data located in an associated media description file 2.1.4 Streaming files Media content of files may be stored as downloadable files or as streaming files. Downloadable content is indexed by connecting to an HTTP server, downloading the media file, and then analyzing the file for the purposes of building a media rich index.

In the case of streaming, multimedia content, block 214, an HTTP server stores, not the content itself, but instead a reference to the media file. Therefore, the process of indexing such a file is not as straightforward as for a downloadable file which is stored on the HTTP server and may be downloaded from the server.

In the case of streaming media files certain information is gathered, block 215, as will be described with reference to FIG. 2C.

Below is described a method for indexing streaming files to index audio content and to index video content:

download the media file reference corresponding to the correct streaming media type
for each URL listed in the media file reference, perform the following operation:
 connect directly to the media file on the media server where it resides, block 221
 commence streaming of the media on the appropriate TCP socket, block 222
 query the streaming media to obtain appropriate content attributes and header data, block 223 add all relevant content attributes and header information into the media rich index, block 224 (header information to be queried and indexed includes title, author, copyright; in the case of a video media file, additional information indexed may also include duration, video resolution, frame rate, etc.)

determine if streaming text or synchronized multimedia information, is included, block 225.

if it is, then stream the entire media clip, and index all text within the synchronized media track of the media file if possible, store the time code for each block of text which occurs with the streaming media This method can be applied to any streaming technology, including both streaming sound and video. The media data which is indexed includes information which is resident in the file header (i.e., title, author, copyright), and which can be computed or analyzed based on information in the media file (i.e., sound volume level, video color and brightness, etc.).

The latter category of information includes content attributes which can be computed while the media is streaming, or after the media has completed streaming from a server. It should be noted that once the streaming media has been queried and received results back from the server, the streaming process can conclude as the indexing is complete.

2.2 Generate and weight a media index

As the network is crawled, a media index is generated by storing the information which has been discussed above in an index format. The media index is weighted to provide for increased accuracy in the searching capabilities. In the described embodiment, the weighing scheme is applied factoring a weight factor for each of the following text items:

| ITEM | WEIGHTING FACTOR |
|---|---|
| URL of the media file | 10 |
| Keywords embedded in the media file | 10 |
| Textual annotations in the media file | 10 |
| script dialogue, lyrics, and closed captioning in the media file | 10 |
| Text strings associated with the media file anchor reference | 9 |
| Text surrounding the media file reference | 7 |
| Title of the HTML document containing the media file | 6 |
| Keywords and meta-tags associated with the HTML document | 6 |
| URL for the HTML document containing the media file reference | 5 |

In other embodiments, alternative weighting factors may be utilized without departure from the present invention.

2.3 Store data for each media object

Finally, data is stored for each media object. In the described embodiment, the following data is stored:

Relevant text

HTML document title

HTML meta tags

Media specific text (e.g., closed captioning, annotations, etc.)

Media URL

Anchor text

Content previews (discussed below)

Content attributes (such as brightness, color or B/W, contrast, speech v. music and volume level. In addition, sampling rate, frame rate, number of tracks, data rate, size may be stored).

Of course, in alternative embodiments a subset or superset of these fields may be used.

3.0 Content analysis

As was briefly mentioned above, it is desirable to not only search the lexical content surrounding a media file, but also to search the content of the media file itself in order to provide a more meaningful database of information to search.

As was shown in FIG. 1, the present invention is generally concerned with indexing two types of media files (i) audio 102 and (ii) video 103.

3.1 Video Content

The present invention discloses an algorithm used to predict the likelihood that a given video file contains a low, medium or high degree of motion. In the described embodiment, the likelihood is computed as a single scalar value, which maps into one of N buckets of classification. The value associated with the motion likelihood is called the "motion" metric. A method for determining and classifying the brightness, contrast and color of the same video signal is also described. The combination of the motion metric along with brightness, contrast and color estimates enhance the ability of users to locate a specific piece of digital video.

Once a motion estimate and brightness, contrast and color estimate exist for all video files located in an index of multimedia content, it is possible for users to execute search queries such as:

"find me all action packed videos"

"find me all dramas and talk shows"

If the digital video information is indexed in a database together with auxiliary text-based information, then it is possible to execute queries such as:

"find me all action packed videos of James Bond from 1967"

"find me all talk shows with Bill Clinton and Larry King from 1993"

Combining motion with other associated video file parameters, users can execute queries such as:

"find me all slow moving, black and white movies made by Martin Scorcese"

"find me all dark action movies filmed in Zimbabwe"

The described method for estimating motion content and brightness, contrast and color can be used together with the described algorithm for searching the worldwide Internet in order to index and intelligently tag digital multimedia content. The described method allows for powerful searching based on information signals stored inside the content within very large multimedia databases. Once an index of multimedia information exists which includes a motion metric and brightness, contrast and color estimate, users can perform field based sorting of multimedia databases. For example, a user could execute the query: find me all video, from slow moving to fast, by Steven Spielberg, and the database engine would return a list of search results, ordered from slowest to fastest within the requested motion range. In addition, if the digital video file is associated with a digital audio sequence, then an analysis of the digital audio can occur. An analysis of digital audio could determine if the audio is either music or speech. It can also determine if the speaker is male or female, and other information. This type of information could then be used to allow a user query such as:

"find me all fast video clips which contain loud music";

"find me all action packed movies starring Sylvester Stallone and show me a preview of a portion of the movie where Stallone is talking".

This type of powerful searching of content will become increasingly important, as vast quantities of multimedia information become digitized and moved onto digital networks which are accessible to large numbers of consumer and business users.

The described method, in its preferred embodiment, is relatively fast to compute. Historically, most systems for analyzing video signals have operated in the frequency domain. Frequency domain processing, although potentially more accurate than image based analysis, has the disadvantage of being compute intensive, making it difficult to scan and index a network for multimedia information in a rapid manner.

The described approach of low-cost computation applied to an analysis of motion and brightness, contrast and color has been found to be useful for rapid indexing of large quantities of digital video information when building searchable multimedia databases. Coupled with low-cost computation is the fact that most video files on large distributed networks (such as the Internet) are generally of limited duration. Hence the algorithms described herein can typically be applied to short duration video files in such a way that they can be represented as a single scalar value. This simplifies presentation to the user.

In addition to the image space method described here, an algorithm is presented which works on digital video (such as MPEG) which has already been transformed into a frequency domain representation. In this case, the processing can be done solely by analyzing the frequency domain and motion vector data, without needing to perform the computation moving the images into frequency space.

3.1.1 Degree of Motion Algorithm Details (Image Space)

In order to determine if a given video file contains low, medium or high amounts of motion, it is disclosed to derive a single valued scalar which represents the video data file to a reasonable degree of accuracy. The scalar value, called the motion metric, is an estimate of the type of content found in the video file. The method described here is appropriate for those video files which may be in a variety of different coding formats (such as Vector Quantization, Block Truncation Coding, Intraframe DCT coded), and need to be analyzed in a uniform uncompressed representation. In fact, it is disclosed to decode the video into a uniform representation, since it may be coded in either an intraframe or an interframe coded format. If the video has been coded as intraframe, then the method described here is a scheme for determing the average frame difference for a pixel in a sequence of video. Likewise, for interframe coded sequences, the same metric is determined. This is desirable, even though the interframe coded video has some information about frame to frame differences. The reason that the interframe coded video is uncompressed and then analyzed, is that different coding schemes produce different types of interframe patterns which may be non uniform. The disclosed invention is based on three discoveries:

- time periods can be compressed into buckets which average visual change activity
- the averaged rate of change of image activity gives an indication of overall change
- an indication of overall change rate is correlated with types of video content The indication of overall change has been found to be highly correlated with the type of video information stored in an video file. It has been found through empirical examination that

- slow moving video is typically comprised of small frame differences
- moderate motion video is typically comprised of medium frame differences
- fast moving video is typically comprised of large frame differences and that,
- video content such as talking heads and talk shows are comprised of slow moving video
- video content such as newscasts and commercials are comprised of moderate speed video
- video content such as sports and action films are comprised of fast moving video The disclosed method operates generally by accessing a multimedia file and evaluating the video data to determine the visual change activity and by algorithm to compute the motion metric operates as follows:

A. Motion Estimator

- if the number of samples N exceeds a threshold T, then repeat the Motion Estimator algorithm below for a set of time periods P=N/T. The value Z computed for each period P is then listed in a table of values.
- as an optional preprocessing step, employ an adaptive noise reduction algorithm to remove noise. Apply either a flat field (mean), or stray pixel (median) filter to reduce mild and severe noise respectively.
- if the video file contains RGB samples, then run the algorithm and average the results into a single scalar value to represent the entire sequence B. Motion Estimator

- determine a fixed sampling grid in time consisting of X video frames
- if video samples are compressed, then decompress the samples
- decompress all video samples into a uniform decoded representation
- adjust RGB for contrast (low/med/high)
- compute the RGB frame differences for each frame X with its nearest neighbor
- sum up all RGB frame differences for each pixel in each frame X
- compute the average RGB frame difference for each pixel for each frame X
- sum and then average RGB frame differences for all pixels in all frames in a sequence.
- the resulting value is the motion metric Z. The motion metric Z is normalized by taking Z-NORMAL=Z*(REF-VAL/MAX-DIFFERENCE) where MAX-DIFFERENCE is the maximum difference for all frames.
- map the value Z into one of five categories
  - low degree of motion
  - moderate degree of motion
  - high degree of motion
  - very high degree of motion Using a typical RGB range of 0–255, the categories for the scalar Z map to:
- 0–20, motion content, low
- 20–40, motion content, moderate
- 40–60, motion content, high
- 60 and above, motion content, very high A specific example, using actual values, is as follows:
- number of video frames X=1000
- sample size is 8 bits per pixel, 24 bits for RGB
- average frame difference per frame is 15
- the sequence is characterized as low motion Note that when the number of video frames exceeds the threshold T, then the percentage of each type of motion metric category is displayed. For example, for a video sequence which is one hour long, which may consist of different periods of low, moderate and high motion, the resulting characterization of the video file would appear as follows:

40%, motion content low

10%, motion content moderate

50%, motion content high

Once the degree of motion has been computed, it is stored in the index of a multimedia database. This facilitates user queries and searches based on the degree of motion for a sequence, including the ability to provide field based sorting of video clips based on motion estimates.

3.1.2 Degree of Motion Algorithm Details (Frequency Domain)

The method described above is appropriate for those video files which may be in a variety of different coding formats (such as Vector Quantization, Block Truncation Coding, Intraframe DCT coded), and need to be analyzed in a uniform uncompressed representation. The coded representation is decoded and then an analysis is applied in the image space domain on the uncompressed pixel samples. However, some coding formats (such as MPEG) already exist in the frequency domain and can provide useful information regarding motion, without a need to decode the digital video sequence and perform frame differencing averages. In the case of a coding scheme such as MPEG, the data in its native form already contains estimates of motion implicitly (indeed, the representation itself is called motion estimation). The method described here uses the motion estimation data to derive an estimate of motion for a full sequence of video in a computationally efficient manner.

In order to determine if a given video file contains low, medium or high amounts of motion, it is necessary to derive a single valued scalar which represents the video data file to a reasonable degree of accuracy. The scalar value, called the motion metric, is an estimate of the type of content found in the video file. The idea, when applied to MPEG coded sequences, is based on four key principles:

the MPEG coded data contains both motion vectors and motion vector lengths the number of non-zero motion vectors is a measure of how many image blocks are moving the length of motion vectors is a measure of how far image blocks are moving averaging the number and length of motion vectors per frame indicates degrees of motion The indication of overall motion has been found to be correlated with the type of video information stored in an video file. It has been found through empirical examination that slow moving video is comprised of few motion vectors and small vector lengths moderate video is comprised of moderate motion vectors and moderate vector lengths fast moving video is comprised of many motion vectors and large vector lengths and that, video content such as talking heads and talk shows are comprised of slow moving video video content such as newscasts and commercials are comprised of moderate speed video video content such as sports and action films are comprised of fast moving video An algorithm to compute the motion metric may operates as follows:

Motion Estimator (Frequency Domain)

if the number of frames N exceeds a threshold T, then repeat the Motion Estimator algorithm below for a set of time periods P=N/T. The value Z computed for each period P is then listed in a table of values.

Motion Estimator Algorithm determine a fixed sampling grid in time consisting of X video frames determine the total number of non-zero motion vectors for each video frame determine the average number of non-zero motion vectors per coded block determine the average length of motion vectors per coded block sum and average the number of non-zero motion vectors per block in a sequence as A sum and average the length of non-zero motion vectors per block in a sequence as B compute a weighted average of the two averaged values as $Z=W1*A+W2*B$ the resulting value is the motion metric Z map the value Z into one of five categories low degree of motion moderate degree of motion high degree of motion very high degree of motion Note that when the number of video frames exceeds the threshold T, then the percentage of each type of motion metric category is displayed. For example, for a video sequence which is one hour long, which may consist of different periods of low, moderate and high motion, the resulting characterization of the video file would appear as follows:

40%, motion content low

10%, motion content moderate

50%, motion content high

3.1.3 Brightness, Contrast and Color Algorithm Details

In order to determine if a given video file contains dark, moderate or bright intensities, it is necessary to derive a single valued scalar which represents the brightness information in the video data file to a reasonable degree of accuracy. The scalar value, called the brightness metric, is an estimate of the brightness of content found in the video file. The idea is based on two key principles:

time periods can be compressed into buckets which average brightness activity the buckets can be averaged to derive an overall estimate of brightness level By computing the luminance term for every pixel in a frame, and then for all frames in a sequence, and averaging this value, we end up with an average luminance for a sequence.

The same method above can be applied to determining a metric for contrast and color, resulting in a scalar value which represents an average contrast and color for a sequence.

3.1.4 Search Results Display

Once the motion and brightness level estimates have been determined, the values are displayed to user in tabular or graphical form. The tabular format would appear as shown below:

Degree of motion: high

Video intensity bright

The end result is a simple display of two pieces of textual information. This information is very low bandwidth, and yet encapsulates an extensive processing and computation on the data set. And users can more quickly find the multimedia information.

3.2 Audio Content

Figure 3A:
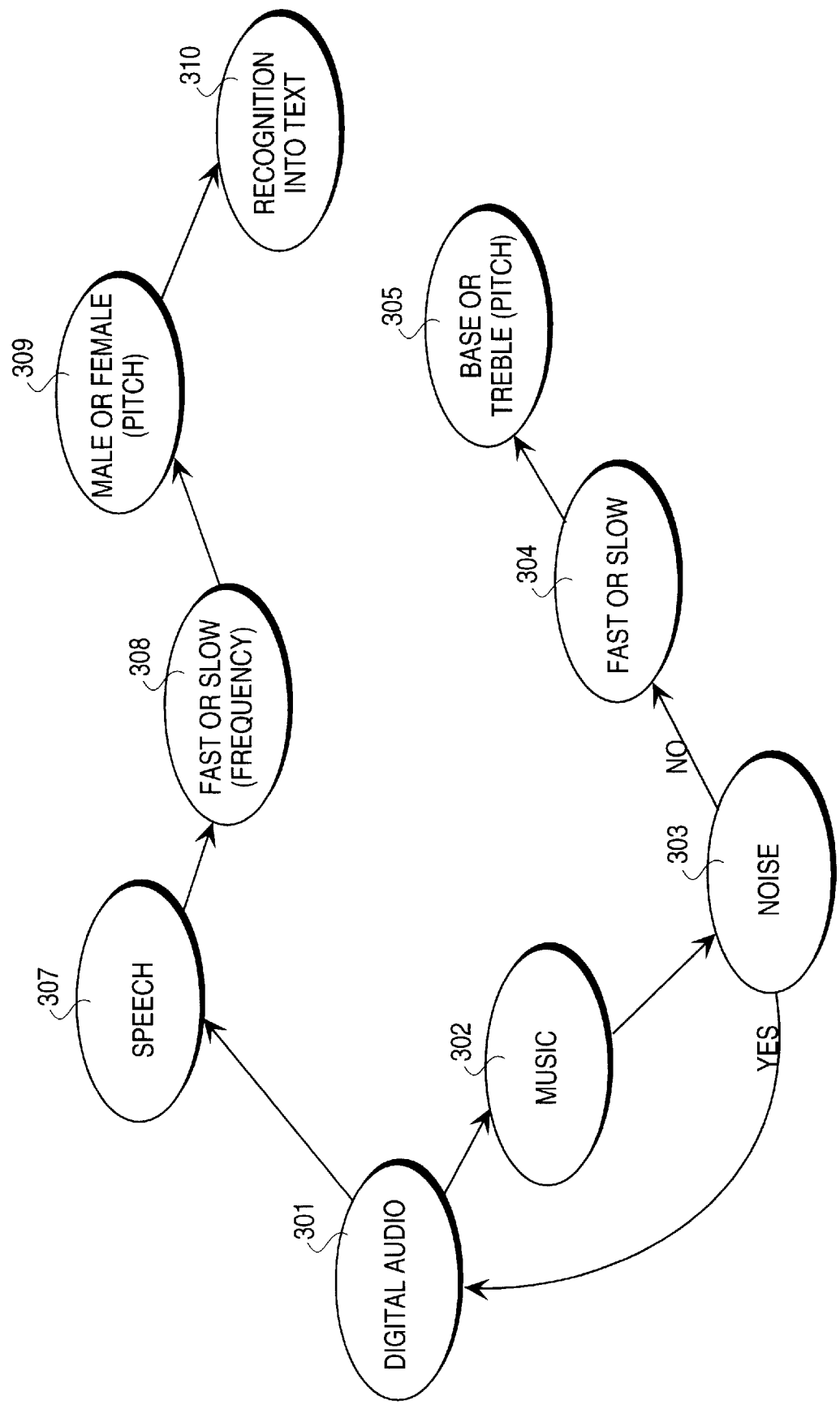
FIG. 3A illustrates an overall diagram showing analysis of digital audio files.

Before reviewing an algorithm used by the disclosed embodiment for analyzing audio files in detail, it is worthwhile to briefly turn to FIG. 3A which provides an overview of the process. A digital audio file is initially analyzed 301 and an initial determination is made whether the file is speech 307 or music 302. If the file is determined to be music, in one embodiment, if the file is "noisy", a noise reduction filter may be applied and the analysis repeated 303. This is because a noisy speech file may be misinterpreted as music. If the file is music, an analysis may be done to determine if the music is fast or slow 304 and an analysis may be done to determine if the music is bass or treble 305 based on a pitch analysis. In the case of speech, an analysis might be done to determine if the speech 308 is fast or slow based on frequency and whether it is male or female 309 based on pitch. By way of example, knowing that a portion of an audio track for a movie starring Sylvester Stallone has a fast, male voice, may be interpreted by retrieval software as indicating that portion of the audio track is a action scene involving Sylvester Stallone. In addition, in certain embodiments, it may be desirable to perform voice recognition analysis to recognize the voice into text 310. In some embodiments, the voice recognition capability may be limited to only recognizing a known voice, while in other more advanced embodiments, omni-voice recognition capability may be added. In either event, the recognized text may be added to the stored information for the media file and be used for searching and retrieval.

3.2.1 Computation of a music-speech metric

In order to determine if a given audio file contains music, speech, or a combination of both types of audio, it is disclosed in one embodiment to derive a single valued scalar which represents the audio data file to a reasonable degree of accuracy. The scalar value, called the music-speech metric, is an estimate of the type of content found in the audio file. The idea is based on three key principles:

- time periods can be compressed into buckets which average amplitude activity
- the averaged rate of change of amplitude activity gives an indication of overall change
- an indication of overall amplitude change rate is correlated with types of audio content The indication of overall change has been found to be highly correlated with the type of audio information stored in an audio file. It has been found through empirical examination that

Figure 3C:
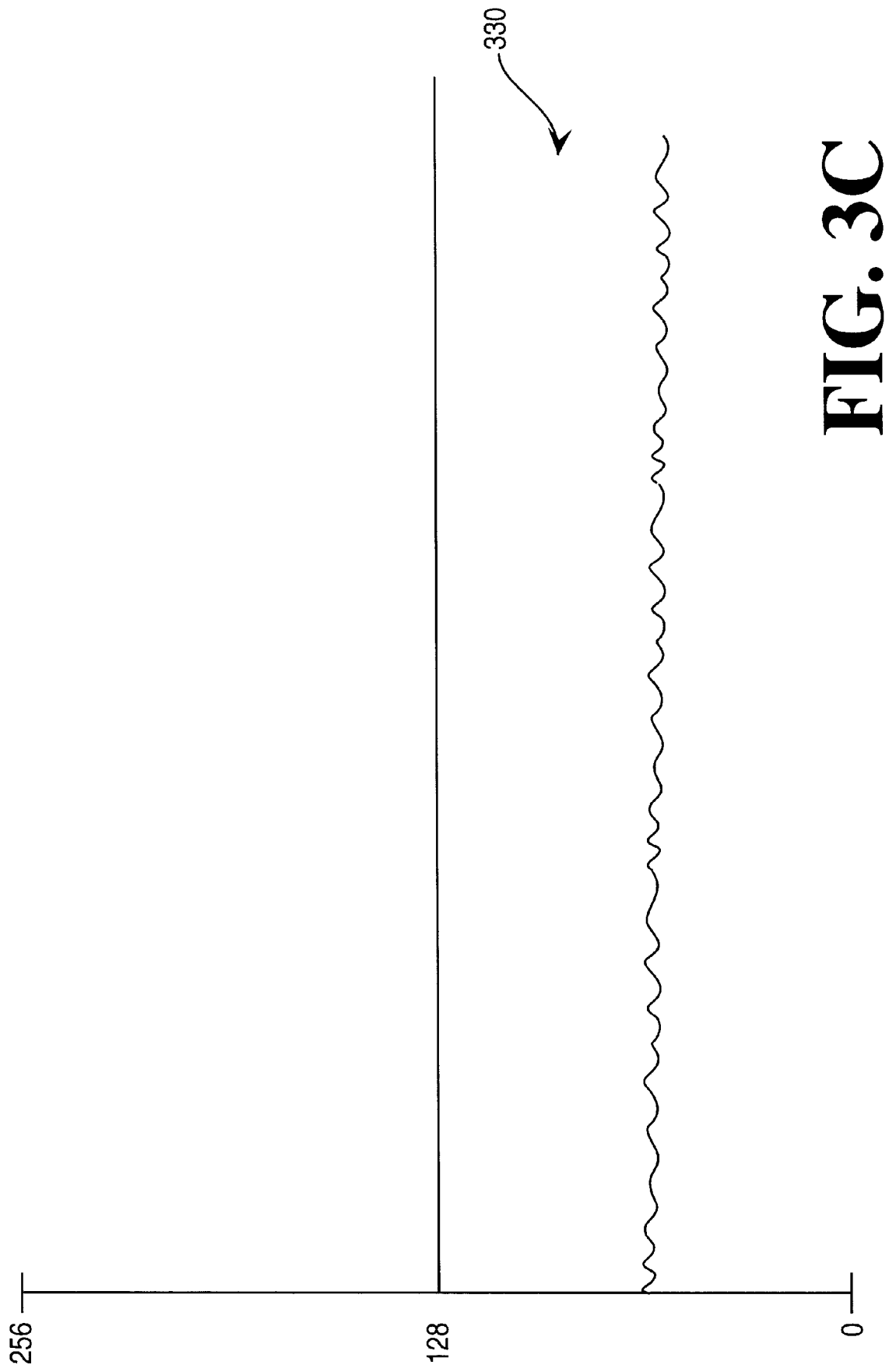

- music is typically comprised of a continuous amplitude signal
- speech is typically comprised of a discontinuous amplitude signal
- sound effects are typically comprised of a discontinuous amplitude signal and that,

- music signals are typically found to have low rates of change in amplitude activity
- speech signals are typically found to have high rates of change in amplitude activity
- sound effects are typically found to have high rates of change in amplitude activity
- audio comprised of music and speech has moderate rates of change in amplitude activity Continuous signals are characterized by low rates of change. Various types of music, including rock, classical and jazz are often relatively continuous in nature with respect to the amplitude signal. Rarely does music jump from a minimum to a maximum amplitude. This is illustrated by FIG. 3C which illustrates a typical amplitude signal 330 for music.

Similarly, it is rare that speech results in a continuous amplitude signal with only small changes in amplitude. Discontinuous signals are characterized by high rates of change. For speech, there are often bursty periods of large amplitude interspersed with extended periods of silence of low amplitude. This is illustrated by FIG. 3B which illustrates a typical amplitude signal 320 for speech.

Figure 3D:
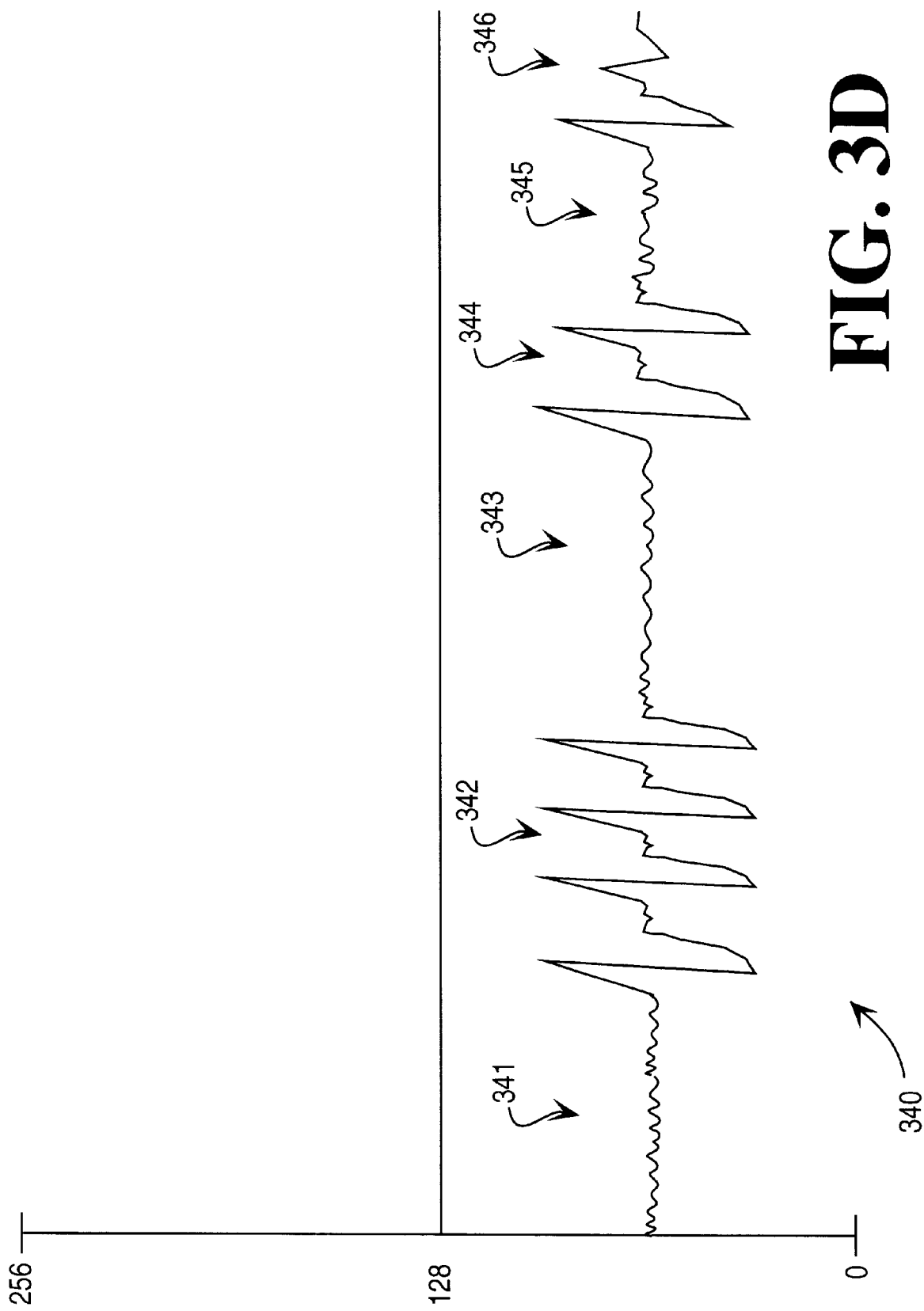

Sometimes speech will be interspersed with music, for example if there is talk over a song. This is illustrated by FIG. 3D which illustrates signal 340 having period 341 which would be interpreted as music, period 342 which would be speech, period 343 music, period 344 speech, period 345 music and period 346 speech.

For sound effects, there are often bursty periods of large amplitude interspersed with bursty periods of low amplitude.

Figure 3E:
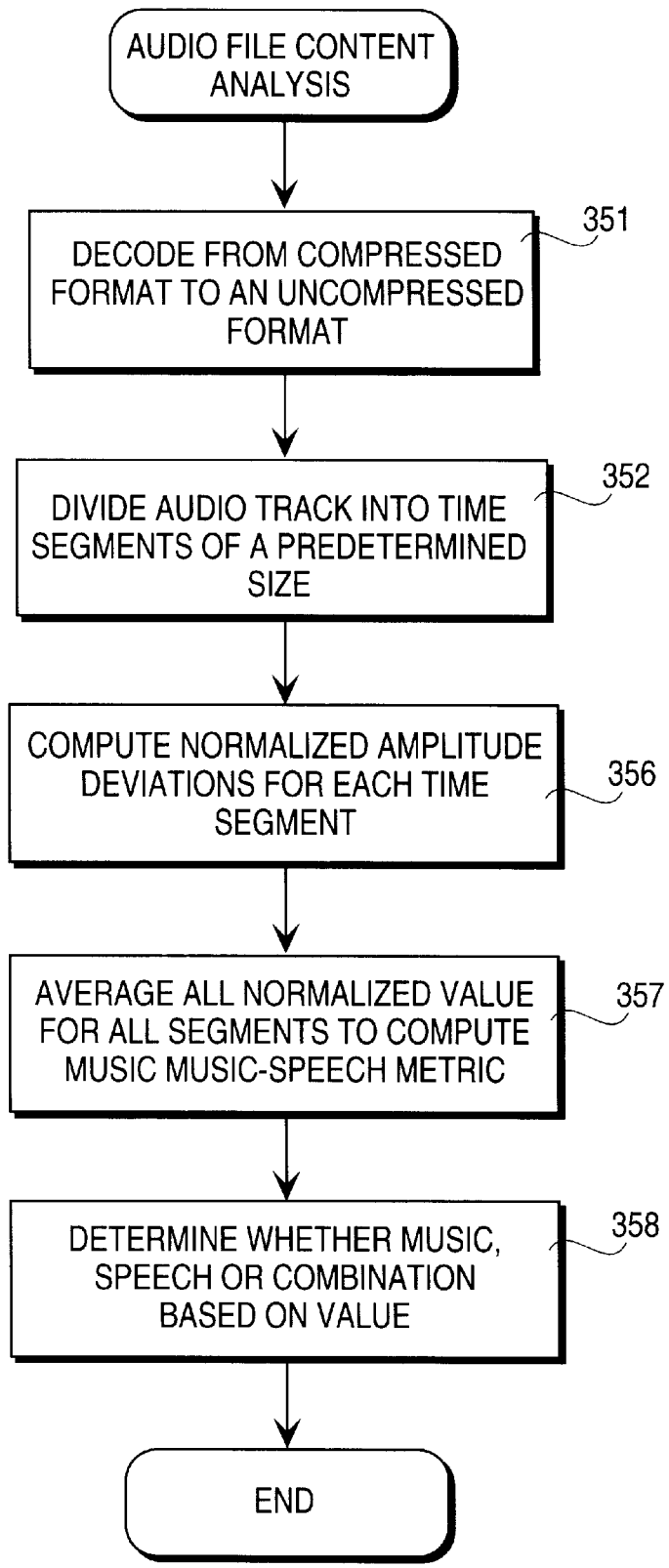
FIG. 3E–H illustrate a flow diagram of a method of analyzing content of digital audio files.
Figure 3F:
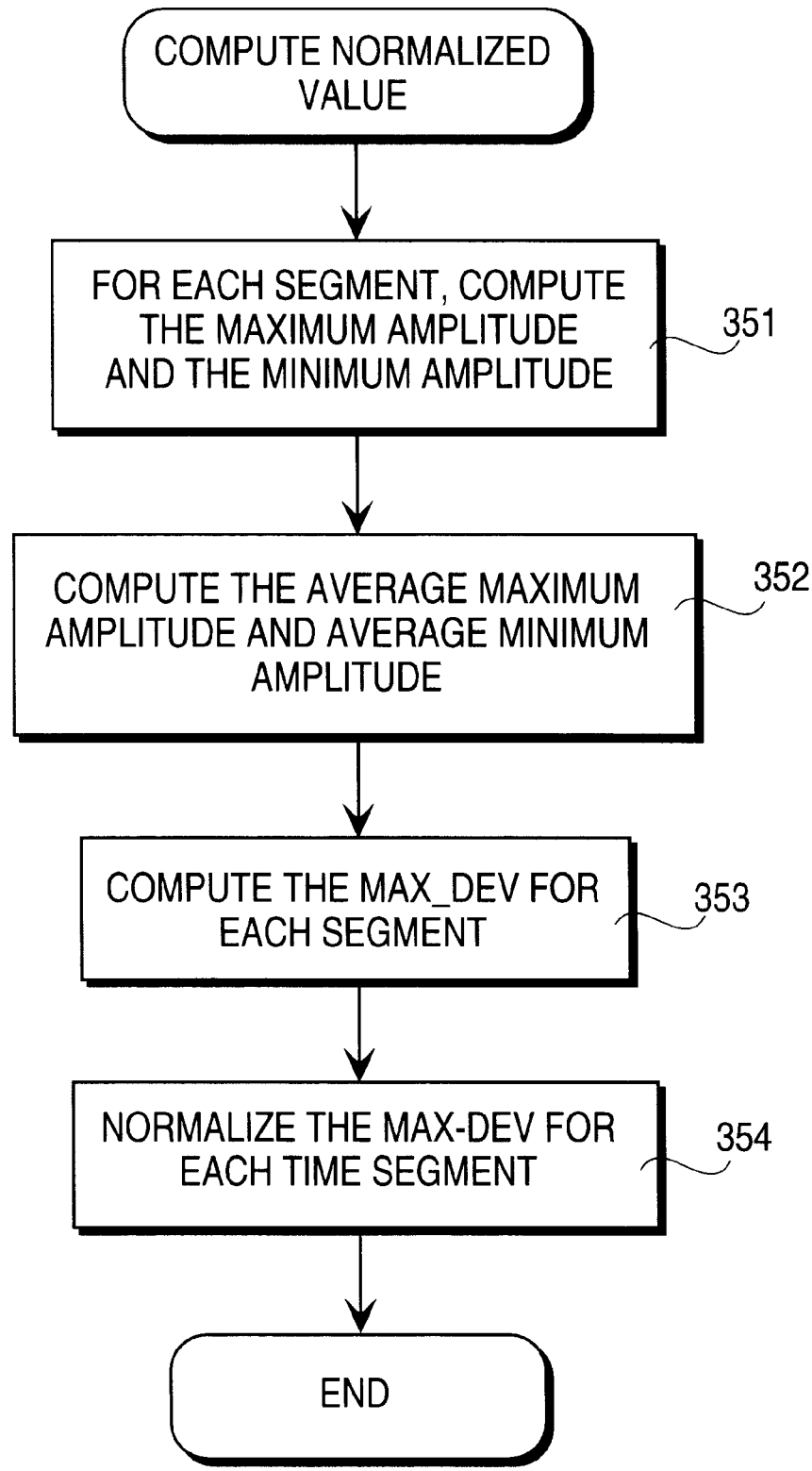

Turning now to FIG. 3E, if the audio file is a compressed file (which may be in any of a number of known compression formats), it is first decompressed using any of a known decompression algorithm, block 351. A amplitude analysis is then performed on the audio track to provide a music speech metric value. The amplitude analysis is performed as follows:

The audio track is divided into time segments of a predetermined length, block 352. In the described embodiment, each time segment is 50 ms. However, in alternate embodiments, the time segments may be of a greater or lesser length.

For each segment, a normalized amplitude deviation is computed, block 356. This is described in greater detail with reference to FIG. 3F. First, for each time segment, the maximum amplitude and minimum amplitude is determined, block 351. In the example of FIG. 3B, values range from 0 to 256 (in an alternative embodiment, the values may be based on floating point calculations and may range from 0 to 1.0). For the first interval 321, the maximum amplitude value is shown as 160, for the second interval 322, it is 158 and for the third interval 323, it is 156. Then, the average maximum amplitude and average minimum amplitude is computed for all time intervals, block 352. Again, using the example in FIG. 3B, the average maximum amplitude will be 158. Next, a value MAX-DEV is computed for each interval as the absolute value of maximum amplitude for the interval minus the average maximum, block 353. For the first interval of FIG. 3b, the MAX-DEV will be 2, for the second interval, it will be 0 and for the third interval, it will be 2. Finally, the MAX-DEV is normalized by computing MAX-DEV * (REF-VALUE/MAX) where the reference value is 256 in the described embodiment (and may be 1.0 in a floating point embodiment) and MAX is the maximum amplitude for all of the intervals. Thus, for the first interval, the normalized value for MAX-DEV will be 160−(256/160)=256. Normalizing the deviation value provides for removing dependencies based on volume differences in the audio files and allows for comparison of files recorded at different volumes.

Finally, the normalized MAX-DEV values for each segment are averaged together, block 357, to determine a music-speech metric. High values tend to indicate speech, low values tend to indicate music and medium values tend to indicate a combination, block 358.

It should be noted that if for efficiency, only a portion of the audio file may be analyzed. For example, N seconds of the audio file may be randomly chosen for analysis. Also, if the audio file contains stereo or quadraphonic samples, then run the algorithm described above may be run on each channel, and the results averaged into a single scalar value to represent the entire sequence.

Note also that when the number of samples exceeds the threshold T, then the percentage of each type of music-speech metric category may computed and displayed. For example, for a soundtrack which is one hour long, which may consist of different periods of silence, music, speech and sound effects, the resulting characterization of the audio file would appear as follows:

40%, music content: high, speech content: low
10%, music content: high, speech content: medium
10%, music content: medium, speech content: medium
10%, music content: medium, speech content: high
30%, music content: low, speech content: high

3.2.2 Volume Algorithm Details

Figure 3G:
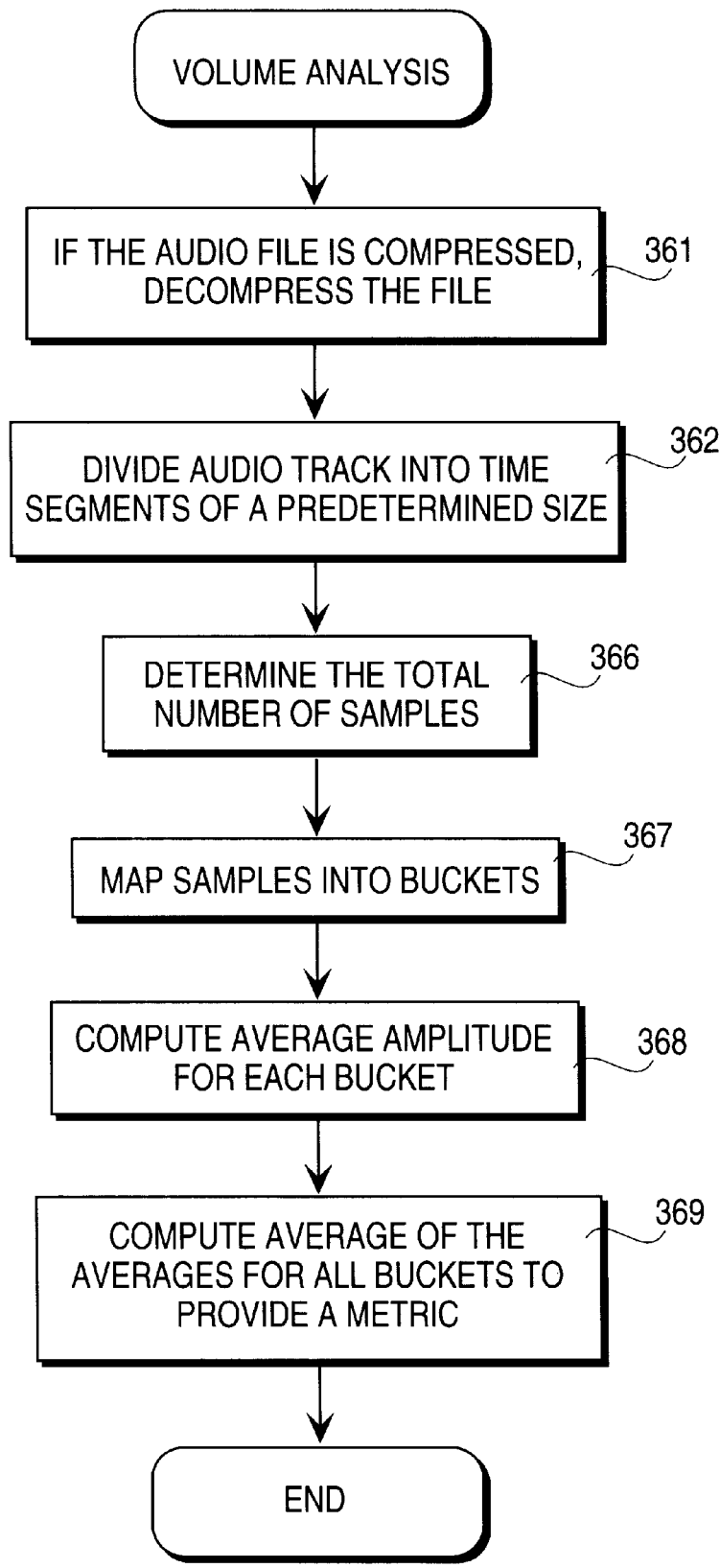
Figure 3H:
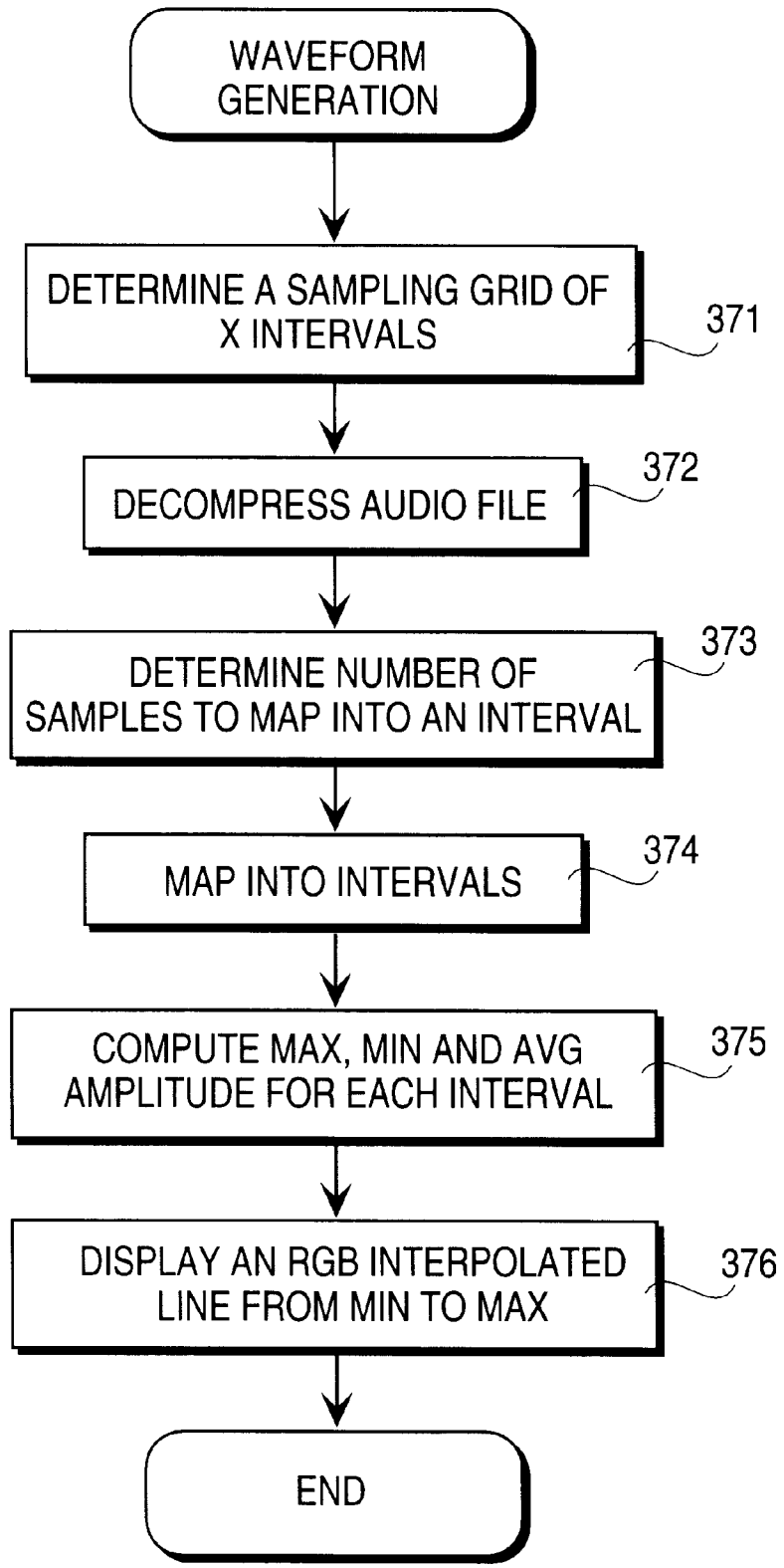

In order to determine if a given audio file contains quiet, soft or loud audio information, it is disclosed to derive a single valued scalar which represents the volume information in the audio data file to a reasonable degree of accuracy. The scalar value, called the volume level metric, is an estimate of the volume of content found in the audio file. The idea is based on three key principles:

time periods can be compressed into buckets which average volume activity the buckets can be averaged to derive an overall estimate of volume level In general, the disclosed algorithm provides for determining the volume level of data in an audio file by evaluating the average amplitude for set of sampled signals. In particular, the disclosed algorithm comprises the steps of:

if the number of samples N exceeds a threshold T, then repeat the Volume Audio Channel Estimator algorithm, below, for a set of time periods P=N/T. The value Z computed for each period P is then listed in a table of values.

if the audio file contains mono samples, then run the algorithm on a single channel if the audio file contains stereo samples, then run the algorithm on each channel, and average the results into a single scalar value to represent the entire sequence if the audio file contains quadraphonic samples, then run the algorithm on each channel, and average the results into a single scalar value to represent the entire sequence The algorithm used by the described embodiment for volume estimation is then given by FIG. 3G as follows:

if audio samples are compressed, then decompress the samples into a uniform PCM coded representation, block 361.

The audio track is mapped into X time segment buckets, 362.

determine the total number of audio samples N, block 366. The samples will get mapped into time segment buckets, block 367. The mapping is such that a single bucket represents N/X samples of sound and the N/X samples is called a compressed time sample C Compute the average amplitude value for each bucket X, 368 by summing up all amplitude values within C and dividing to obtain an average amplitude.

compute the average amplitude A for all X buckets, block 369 the resulting value is volume estimate A map the value A into one of five categories:
quiet
soft
moderate
loud
very loud Using a typical maximum amplitude excursion of 100, the categories for A map to:
0–50, quiet
50–70, soft
70–80, moderate
80–100, loud
100–above, very loud It will be apparent to one skilled in the art that alternate "bucket sizes" can be used and the mapping may be varied from the mapping presented in the disclosed algorithm without departure from the spirit and scope of the invention.

When the number of samples exceeds the threshold T, then the percentage of each type of volume category is displayed. For example, for a soundtrack which is one hour long, which may consist of different periods of silence, loudness, softness and moderate sound levels, the resulting characterization of the audio file would appear as follows:

30%, quiet
20%, soft
5%, moderate
10%, loud
35%, very loud

3.2.3 Search Results Display

Once the music-speech and volume level estimates have been determined, the values are displayed to the user in tabular or graphical form The tabular format may appear as shown below:

Music content: high
Speech content: low
Volume level: loud

The end result is a simple display of three pieces of textual information. This information is very low bandwidth, and yet encapsulates an extensive processing and computation on the data set. And users can more quickly find the multimedia information they are looking for.

3.2.4 Waveform display

A focus of the method described herein is to generate a visual display of audio information which can aid a user to determine if an audio file contains the audio content they are looking for. This method is complements the other types of useful information which can be computed and or extracted from digital audio files; the combination of context and content analysis, together with graphical display of content data results in a composite useful snapshot of a piece of digital media information.

As users need to sift through large quantities of music, sound effects and speeches (on large distributed networks such as the Internet) it will be useful to process the audio signals to enhance the ability to distinguish one audio file from another. The use of only keyword based searching for media content will prove to be increasingly less useful than a true analysis and display of the media signal.

The algorithm described herein is used to display a time compressed representation of an audio signal. The method is focused on providing some high level features visually of the time varying sound signal. The method described can allow users to:

differentiate visually between music and speech observe periods of silence interspersed with loud or soft music/speech observe significant changes in volume level identify extended periods in an audio track where volume level is very low or high Using a multimedia search engine it is possible for users to execute a query such as:

"find me all soft music by Beethoven from the seventeenth century"

The results returned might be a set of fifty musical pieces by Beethoven. If the searcher knows that the piece of music they are looking for has a very quiet part towards the end of the piece, the user could view the graphical representation and potentially find the quiet part by seeing the waveform display illustrate a volume decrease towards the end of the waveform image. This could save the searcher great amounts of time that would have been required to listen to all fifty pieces of music.

Using a multimedia search engine it is possible for users to execute a query such as:

"find me all loud speeches by Martin Luther King"

A searcher might be looking for a speech by Martin Luther King, where the speech starts out with him yelling loudly, and then speaking in a normal tone of voice. If twenty speeches are returned from the search engine results, then the searcher could visually scan the results and look for a waveform display which shows high volume at the beginning and then levels off within the first portion of the audio signal. This type of visual identification could save the searcher great amounts of time which would be required to listen to all twenty speeches.

Continuous signals are characterized by low rates of change. Various types of music, including rock, classical and jazz are often relatively continuous in nature with respect to the amplitude signal. Rarely does music jump from a minimum to a maximum amplitude. Similarly, it is rare that speech results in a continuous amplitude signal with only small changes in amplitude. Discontinuous signals are characterized by high rates of change. For speech, there are often bursty periods of large amplitude interspersed with extended periods of silence of low amplitude. For sound effects, there are often bursty periods of large amplitude interspersed with bursty periods of low amplitude. These trends can often be identified computationally, or visually, or using both methods. A method is illustrated here which derives a visual representation of sound in a temporally compressed format. The goal is to illustrate long term trends in the audio signal which will be useful to a user when searching digital multimedia content. Note that the method produces visual images of constant horizontal resolution, independent of the duration in seconds. This means that temporal compression must occur to varying degrees while still maintaining a useful representation of long term amplitude trends within a limited area of screen display.

An algorithm, as used by the described embodiment, to compute and display the waveform operates as follows:

A. Waveform Display if the number of samples N exceeds a threshold T, then repeat the Waveform Display algorithm below for a set of time periods P=N/T. A different waveform is computed for each time period.

if the audio file contains mono samples, then run the algorithm on a single channel if the audio file contains stereo samples, then run the algorithm on each channel, and display the results for each channel if the audio file contains quadraphonic samples, then run the algorithm on each channel, and display the results for each channel B. Waveform Display Algorithm determine a fixed sampling grid in time consisting of X buckets if audio samples are compressed, then decompress the samples decompress all audio samples into a uniform PCM coded representation determine the total number of audio samples N determine the number of samples which get mapped into a single bucket the mapping is that a single bucket represents N/X samples of sound the N/X samples term is called a compressed time sample C compute the minimum, maximum and average amplitude value for each bucket X display an RGB interpolated line from the minimum to the maximum amplitude the line passes through the average amplitude red represents maximum amplitude green represents average amplitude blue represents minimum amplitude the interpolation occurs using integer arithmetic the line is rendered vertically from top to bottom within each bucket X compress the resulting waveform using a DCT based compression scheme (or alternate)

Note that when the number of samples exceeds the threshold T, then a series of waveform displays are computed. For example, for a soundtrack which is one hour long, which may consist of different periods of silence, music, speech and sound effects, the resulting waveform display characterization would need to be broken up into segments and displayed separately. The ability to scan through these displays would then be under user control.

3.2.5 Additional Processing and Analysis of Audio Files

After a digital audio file has been classified as music, speech or a combination of the two, additional processing and analysis can be applied in order to extract more useful information from the data. This more useful information can be used to enhance the ability of users to search for digital audio files.

For the case of audio files which have been classified as music, with some degree of speech content (or which have been classified as speech, with some degree of music content) one can assume that there is a speaking or singing voice within the audio file accompanied with the music. A conventional speech recognition algorithm can then be applied (also called speech to text) which can convert the speech information in the audio file into textual information. This will allow the audio file to then be searchable based on its internal characteristics, as well as the actual lyrics or speech narrative which accompanies the music.

For the case of audio files which have been classified as speech, one can assume that there is a reasonable certainty of a speaking voice within the audio file. A conventional speech recognition algorithm can then be applied (also called speech to text) which can convert the speech information in the audio file into textual information. This will allow the audio file to then be searchable based on its internal characteristics, as well as the actual narrative which is within the audio file. The speech may correspond to closed captioning information, script dialogue or other forms of textual representation.

3.2.6 Determining if a Given Music File contains Fast or Slow Music

When an audio file is first examined, a determination can be made if the audio data is sampled and digitized, or is completely synthetic. If the data has been digitized, then all of the processes described above can be applied. If the data has been synthesized, then the audio file is MIDI information (Musical Instrument Digital Interface). If a file has been identified as MIDI, then it is possible to scan for information in the file regarding tempo, tempo changes and key signature. That information can be analyzed to determine the average tempo, as well as the rate of change of the tempo. In addition, the key signature of the music can be extracted. The tempo, rate of change of tempo and key signature can all be displayed in search results for a user as:

tempo: (slow, moderate, fast)
rate of change of tempo (low, medium, high)
   indicates if the music changes pace frequently
key signature
   key of music
   indication of minor and major key Note that when the number of samples exceeds the threshold T, then the percentage of each type of tempo category is displayed. For example, for a soundtrack which is one hour long, which may consist of different periods of fast, moderate or slow tempo levels, the resulting characterization of the music file would appear as follows:

30%, slow
20%, moderate
20%, fast
30%, very fast

4.0 Previews

The described embodiment is concerned with parsing content files and building low-bandwidth previews of higher bandwidth data files. This allows rapid previewing of media data files, without need to download the entire file.

4.1 Preview Overview

In the described embodiment, for video media files, a preview mechanism has been developed. A sample of the results of search, showing a media preview is given in FIG. 4A. The preview is explained in greater detail with reference to FIG. 4B. FIG. 4B illustrates a preview 410. The preview comprises a first sprocket area 411 at the top of the preview and a second sprocket area at the bottom of the preview, a image area having three images of height IH 412 and width IW 413. The preview itself is of height FH 414 and width FW 415. In addition, in certain embodiments, the preview may include a copyright area 416 for providing copyright information relating to the preview and certain embodiments may contain an area, for example in the upper left hand corner of the first sprocket area 411 for a corporate logo or other branding information.

Figure 4A:
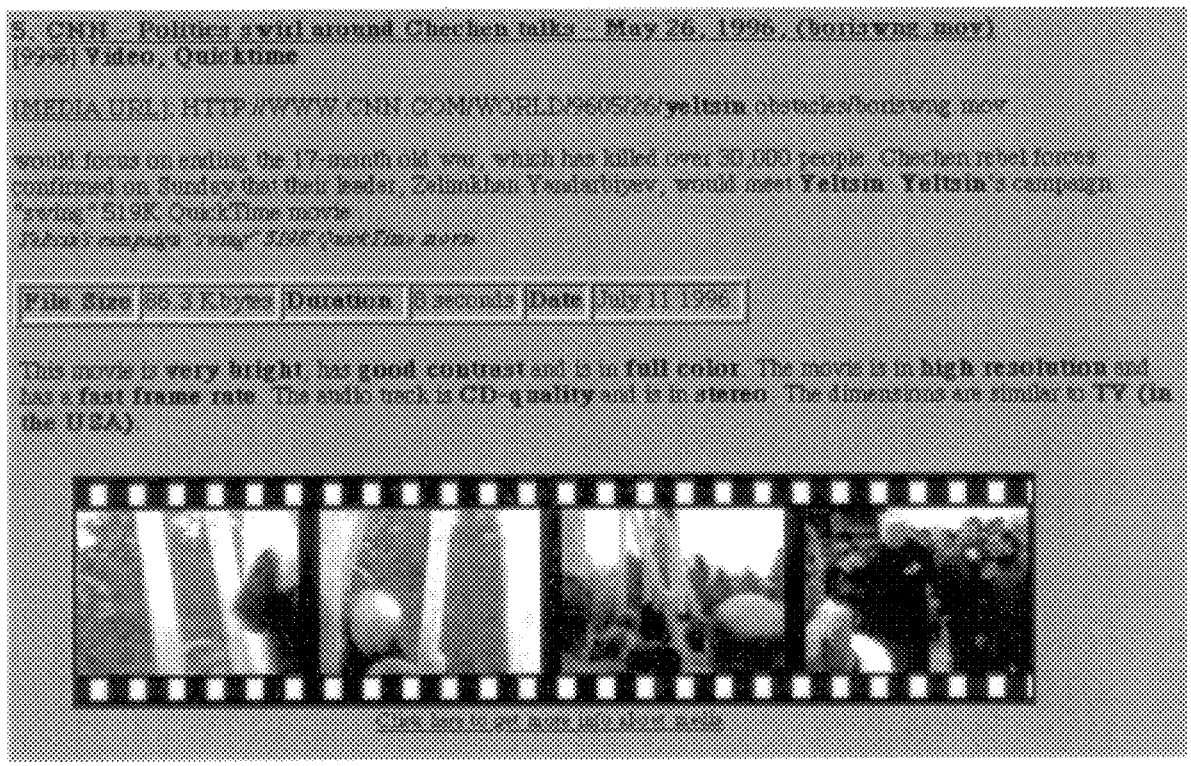
FIG. 4A illustrates a user interface showing search results.
Figure 4B:
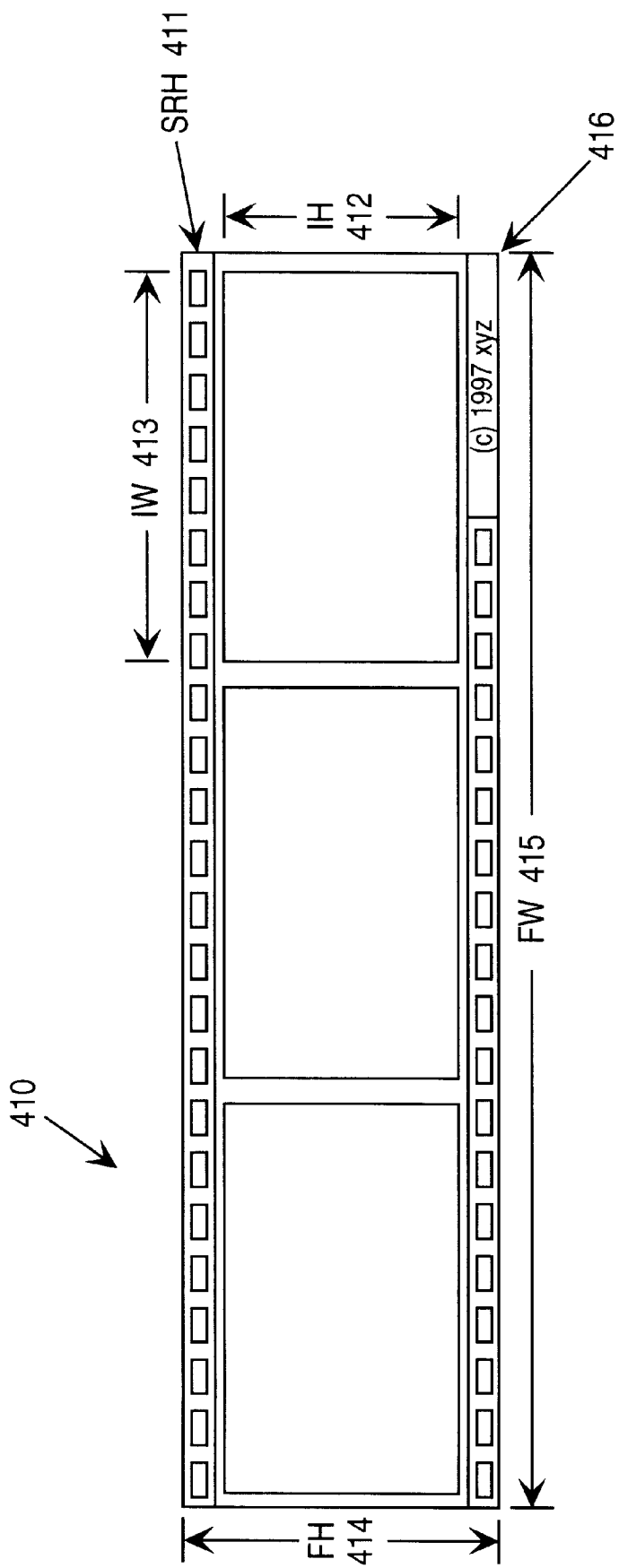
FIG. 4B illustrates components of a preview.
Figure 4C:
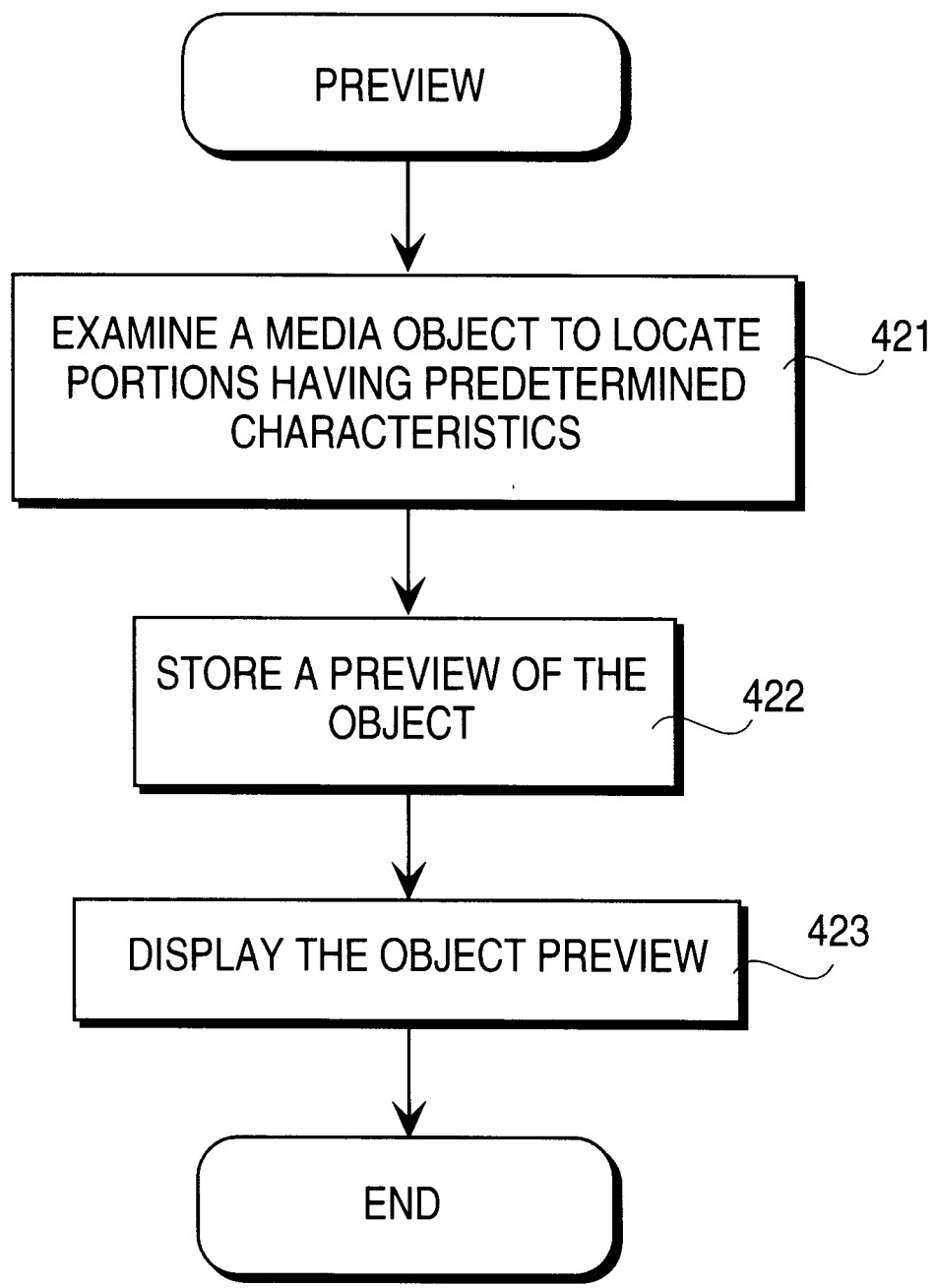
FIG. 4C–4E illustrate a flow diagram of a method of providing for previews.

A general algorithm for generation and display of previews is disclosed with reference to FIG. 4C. Generally, after finding a media object, as was discussed above in Section 1 in connection with crawling to locate media files, the media file is examined to locate portions having predetermined characteristics. For example, portions of a video file having fast action may be located. Or, portions of a video having black and white portions.

Next, a preview of the object is generated and stored. This will be discussed in greater detail in connection with FIG. 4D. Finally, when requested by a user, for example, in response to a search, the preview may be displayed.

4.2 Preview Generation

Figure 4D:
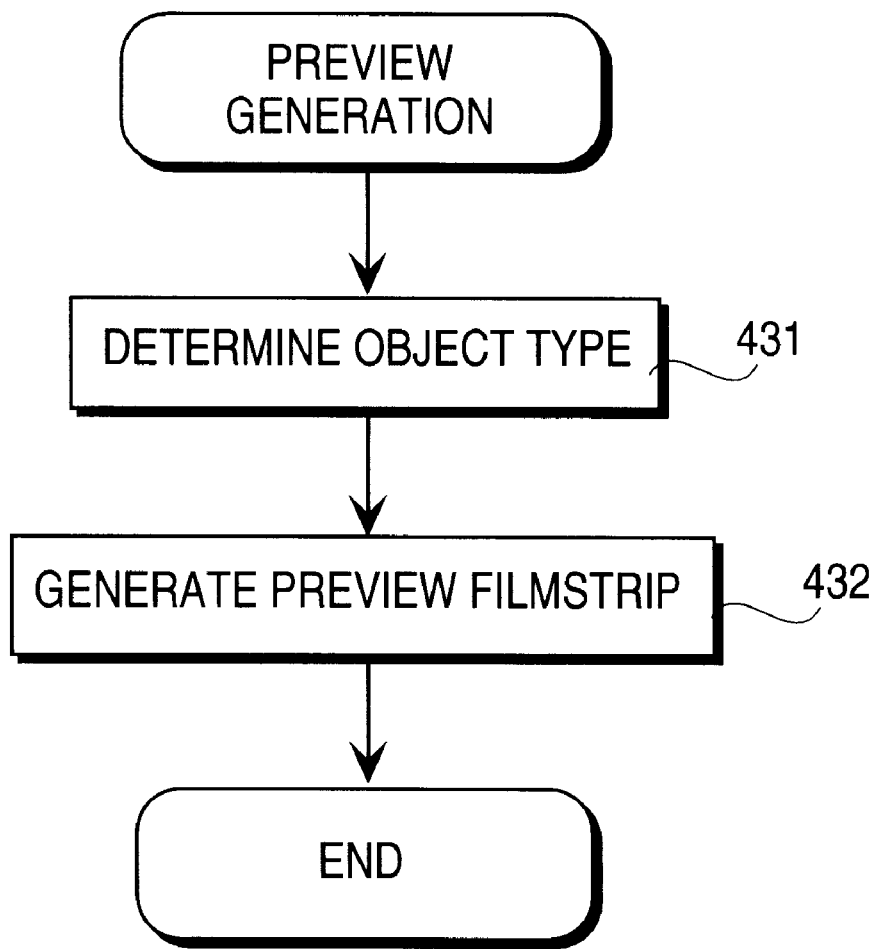
Figure 4E:
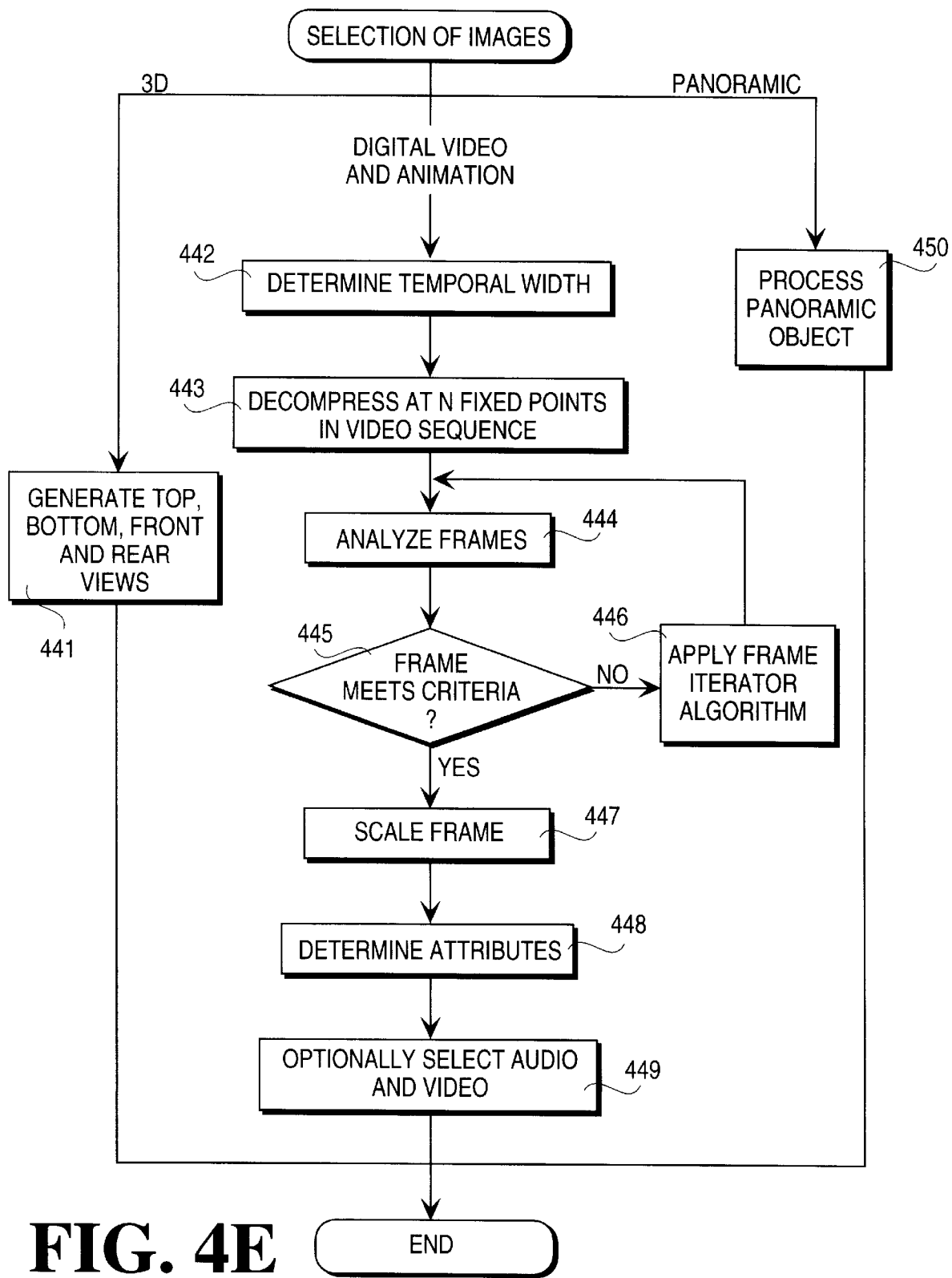

Turning now to FIG. 4D, the process for generation of a preview is discussed in greater detail. Initially, a determination is made of the object type, block 431. The object may be, for example, a digital video file, an animation file, or a panoramic image. In the case of digital video, as was discussed above, the file may be downloadable or streaming. And, if downloadable, the file may have table based frame descriptions or track based frame descriptions. Animation objects include animated series of frames using a lossless differential encoding scheme and hyperlinked animation.

Regardless of the media type, a preview is generated generally along the lines of the preview of FIG. 4A and 4B, block 432.

4.2.1 Sizing of preview and images

The sizing of the preview and of images is done in the described embodiment as follows:

A) Initially, an aspect ratio is computed for the preview. The aspect ratio is computed as the width of a frame of the object divided by the height or A=W/H.

B) The target filmstrip is set with a width FW 415 and a height FH. A distance ID is set for the distance between images on the filmstrip. Next, a a sprocket height and width is set resulting in a sprocket region height (SRH 411). The particular heights and widths may vary from implementation to implementation dependent on a variety of factors such as expected display resolution. In alternative embodiment, differing sprocket designs may be utilized and background colors, etc. may be selected. In certain embodiments, it may be desirable to include copyright information 416 or a logo.

C) In any event, the target height IH 412 of a filmstrip image can be computed as IH=FH−(2*SRH). The target width of an image can be computed as a function of the aspect ratio as follows: IW=A*IH. The number N of filmstrip images which will be displayed can them be computed as N=FW/(IW+ID).

Using the above calculations, the number, width and height of images can be determined for display of a preview.

4.2.2 Selection of images

The selection images for use in the preview is dependent on whether the preview is being generated for a 3D media object, a digital video or animation object, or a panoramic object.

4.2.2.1 Selection of images—Digital Video and Animation

For digital video or animation sequences, a temporal width TW is calculated, block 442, as TW=T/(N+1) where T is equal to the length (time) of the media object and N is the number of frames calculated as discussed above. N frames from the image are then decompressed to pure RGB at N fixed points in the image where the N fixed points at TW, 2*TW, 3*TW, . . . N* TW time into the media image. This process reduces the need to decompress the entire video file. Scanning to the particular ones of the N frames is accomplished by using the table based frame description, the track based frame description or by streaming dependent on the media source file. An objective of choosing N frames spaced TW apart is to develop a preview with frames from various portions of the media file so that the user will be given an opportunity to review the various portions in making a determination if the user wishes to access the entire file.

The decompress process may utilize intraframe, predictive decoding or bilinear decoding dependent on the source file. In the described embodiment, a color space conversion is then performed from RGB to YUV. Optionally, an adaptive noise reduction process may be performed.

Each of the N frames are then analyzed to determine if the frame meets predetermined criteria for display, block 444. Again, an objective is to provide the user with a quality preview allowing a decision if the entire file should be accessed. In the described embodiment, each of the N frames are analyzed for brightness, contrast and quality. If the frames meet for the criteria, block 445, then the frame is scaled, block 447 from its original width W and height H to width IW and height IH using interpolation. Linear interpolation is utilized and the aspect ratio is maintained.

Each frame is also analyzed for a set of attributes, block 448. The attributes in the described embodiment include brightness, contrast (luminance, deviation), chrominance, and dominant color. Brightness indicates the overall brightness of digital video clip. Color indicates if the video clip is in full color or black and white, and contrast indicates the degree of contrast in the movie. These high level content attributes tend to be more meaningful for the typically short video sequences which are published on the Internet and Intranet. The computation for each of the attributes is detailed below. This information can then be used for enhanced searching. For example, chrominance can be used for searching for black and white versus color video. In addition, embodiments may provide for optionally storing a feature vector for texture, composition and structure. These attributes can be averaged across the N frames and the average for each attribute is stored as a searchable metric. In addition, optionally, the contrast of the frames may be enhanced using a contrast enhancement algorithm.

We will now briefly describe computation of the chrominance, luminance and contrast values. The maximum chrominance is computed for the selected N frames in the video sequence. The maximum chrominance for the set of frames is then determined by finding the maximum chrominance for each frame by finding the maximum chrominance for all pixels in each frame.. This maximum chrominance value for the set of selected frames is then compared against a threshold. If the maximum chrominance for the sequence is larger than the threshold, then the sequence is considered in full color. If the maximum chrominance for the sequence is smaller than the threshold, then the sequence is considered in black and white.

The luminance is computed for the selected N frames in the video sequence. The luminance is then averaged into a single scalar value.

To determine contrast, luminance values are computed for each frame of the digital video sequence. The luminance values which fall below the fifth percentile, and above the ninety-fifth percentile are then removed from the set of values. This is done to remove random noise. The remaining luminance values are then examined for the maximum and minimum luminance. The difference between the maximum and minimum luminance is computed as the contrast for a single frame. The contrast value is then computed for all frames in the sequence, and the average contrast is stored as the resulting value.

Finally, audio and video clips may be associated with each frame, block 449. For audio, a standard audio segment may be selected or alternatively an audio selection algorithm may be applied which finds audio which meets predetermined criteria, such as a preset volume level. For video, a video track of duration VD is selected. The video selection may be a standard video segment or the video segment may be selected using a video selection algorithm which selects video segments meeting a predetermined criteria such as video at a predetermined brightness, contrast or motion.

Going back to analysis of the frames, if one of the N frames does not meet the criteria, block 445, a frame iterator algorithm is applied to select a new frame. The frame iterator algorithm of the described embodiment selects another frame by iteratively selecting frames between the frame in question and the other frames until a frame is found which meets the criteria or until a predetermined number of iterations have been applied. If the predetermined number of iteration are applied without successfully finding a frame which meets the criteria, the originally selected frame is used. The algorithm starts with the original frame at TW (or, $2*TW$, $3*TW$ ... $N* TW$) and selects, first, a frame at TW−(TW/2) (i.e., a frame halfway between the original frame and the beginning). If this frame does not meet the criteria, a frame at TW+(TW/2) is selected and iteratively frames are selected according to the pattern:

((TW−(TW/2)), (TW+(TW/2), (TW−(TW/4)), (TW+(TW/4), ... (TW−(TW/X)), (TW+(TW/X))).

4.2.2.2 Selection of images—Panoramic

Interactive panoramic images are often stored as multimedia files. Typically these media files are stored as a series of compressed video images, with a total file size ranging from 100 to 500 Kbytes. The described embodiment provides a method which creates a low bandwidth preview of a panoramic picture. A preview, in the described embodiment utilizes approximately 10 Kbytes in storage size which is only 1/10th to 1/50th of the original panoramic storage. The preview provides a high-quality, low bit rate display of the full panoramic scene. In the described embodiment, the method for creating the panoramic preview, block 450, may be described as follows:

1) extract all information from the header of the media file to determine the width, height and number of tiles for the panoramic scene. Create an offscreen buffer to generate the new panoramic picture preview.
2) For each tiled image on the media file, decode the image using the coding algorithm which was used to encode the original tiles. The decoded files are converted to pure RGB and then to YUV. The tiles are scaled from (W, H) to (IW, IH) similar to as discussed above. In other embodiments, as a next step, the image may be scaled by a factor of two in each direction.
3) Re-orient the tile by rotating it 90 degrees clockwise.
4) For each scaled and rotated tile, copy the image (scanning from right to left) into the offscreen buffer.
5) In the case of embodiment which scales by the factor of two, when all tiles have been processed, examine the resulting picture size after it has been reduced by a factor of two. If the image is below a fixed resolution then the process is complete. If the image is above a fixed resolution, then reduce the picture size again by a factor of two, until it is less than or equal to the fixed resolution.
6) Composite the reconstructed panoramic picture with filmstrip images on the top and bottom of the picture to create a look and feel consistent with the filmstrip images for video sequences.
7) Any of a number of known compression algorithms may be applied to the reconstructed and composited panoramic picture to produce a low bandwidth image preview. Coding schemes can include progressive or interlaced transmission algorithms.

4.2.2.3 Selection of images—3D

For 3D images, a top view, bottom view, front view and rear view are selected for images to display, block 441.

4.3 Interactive Display of Search Results

When returning search results from a user's multimedia query to a database, it is disclosed to generate appropriate commands to drive a web browser display to facilitate interactive viewing of the search results. Depending on the position a user selects (for example with a mouse or other cursor control device) within a preview of the media content shown in the search result, the user will begin interaction with the content at different points in time or space. The end result is a more useful and interactive experience for a user employing a multimedia search engine.

For example, if a user searches for videos of a car, then the web server application can return a series of HTML and EMBED tags which setup a movie controller, allowing a user to interact with the videos of cars. When the low bandwidth preview (a filmstrip showing select scenes of the video clip) is presented to a user, the position of the mouse that is active when a user clicks within the preview will drive the resulting EMBED tags which are created and then returned from the server. For example:

- if a user clicks down in frame X of a filmstrip, then an in-line viewer is created which will begin display and playback of the movie at frame X. In an alternative embodiment, a snipet or short segment of a video or audio file may be stored with the preview and associated with a particular portion of the preview. This method avoids the need to access the original file for playback of a short audio or video segment.
- if a user clicks down at pan angle X, tilt angle Y and fov Z within a panorama filmstrip, then an in-line viewer is created which will begin display of the panorama at those precise viewing parameters.
- if a user clicks down within a select viewpoint of a 3D scene within a filmstrip, then an in-line viewer is created which will begin display of the 3D scene at that viewpoint.
- if a user clicks down within an audio waveform at time T, then an in-line viewer is created which will begin begin playback of the sound at that particular time T.

By allowing users to drive the points in time or space where their display of interactive media begins, users can more precisely hone in on the content they are looking for. For example, if a user is looking for a piece of music which has a certain selection which is very loud, they may observe the volume increase in the graphical waveform display, click on that portion of the waveform and then hear the loud portion of the music. This takes them directly to the selection of interest.

4.4 Use of Media Icons to illustrate search results

When returning search results from a user's multimedia query to a database, the described embodiment provides for both a text and visual method for showing that the search results are of different media types. For example, when executing a search for the word "karate", it is possible that numerous search results will be returned, including digital video, audio, 3D, animation, etc. Video may show karate methods, sound might be an interview with a karate expert, 3D could be a simulation of a karate chop and animation a display of a flipbook of a karate flip. In order to enable a viewer to rapidly scan a page and distinguish the different media types, an icon which is representative of each type of media is employed.

By using a universal set of icons as shown in the figures for media types, it enhance the ability of users to scan a page of search results and quickly jump to those responses which are most relevant. In addition, the use of media icons can transcend barriers of language and culture, making it easier for people from different cultures and speaking different languages to understand search results for multimedia queries.

4.5 Selection of basic, detailed or visual results

In the described embodiment, users can select basic, detailed or visual search results. If a user selects visual search results, then only visual images, filmstrips or waveforms are presented to users as search results. The visual search results are typically displayed as a set of mosaics on a page, usually multiple thumbnail images per row, and multiple filmstrips (usually two) per row. Clicking on images, waveforms or filmstrips then takes users to new web pages where more information is described about the media content. This allows users to rapidly scan a page of visual search results to see if they can find what they are looking for.

4.5 Timecode based display

Text keywords may be found within certain multimedia files (e.g., the content of the file). For example, movie and other video files sometimes contain a movie text track, a closed caption track or a musical soundtrack lyrics track. For each text keyword which is found in one of these tracks, a new database is created by the process of the present invention. This database maps keywords to [text, timecode] pairs. This is done so that it is possible to map keywords directly to the media file and timecode position where the media file text reference occurs. The timecode position is subsequently used when producing search results to viewers, so that viewers can jump directly to that portion of the media sequence where the matching text occurs.

MediaX File Format

The mediaX file provides a hierarchy of information to describe multimedia content files to enhance the ability to search, preview and sample multimedia content. The categories of information which are stored in the mediaX file are as follows.

1. Media Types
2. Media Makers and Creators
3. Media Copyrights and Permission
4. Media Details
5. Media Description information
6. Media Content Attributes
7. Media Location
8. Media Previews
9. Media Commerce
10. Media Editing and Creation
11. Media Playback
12. Media Size, Time and Speed
13. Media Contact Information 1. Media Types
multimedia data type
   i.e, sound, video, MIDI, panorama image, animation
multimedia file format type
   i.e., mov (QuickTime), ra (RealAudio), mpg (MPEG)

2. Media Makers and Creators
title of multimedia file (i.e., "Beethoven's Fifth", the "The Simpsons")
author of content information
director
producer
performers
writers
screenplay
list of characters in cast studio of production
biographies of characters
narrator
composer
cinematographer
costume designers
editors
mixer
additional credits
list of physical locations of creation of content
list of physical locations of sound recording and mix
3. Media Copyrights and Permission
copyright type holder information
   type of copyright
      copyrighted media
      copyleft media, e.g. freely distributed data with indicator of source present
      unknown copyright
copyright holder information
   i.e., "Disney"
indication if multimedia data can be played at a third party search site
   a "permission to show" bit is used in the database
   if content can be shown remotely, specify format of listing.
      text-only
      image previews
      filmstrips
      motion previews
      in-line viewing of full content
      note that each representation includes all previous representations
watermark
   field of arbitrary length to describe watermark usage in content
4. Media Details
number of tracks in the multimedia file
type and ID of each track in the multimedia file
indication of multimedia file format details
   indication if content is digitized, synthesized, etc.
   credits for those providing source content
   language of the multimedia sound data (if available)
      i.e., Chinese, Spanish, etc.
   video parameters:
      frame rate
      specific compression algorithm which is used
   sound parameters:
      number of channels
      sampling rate
      sampling bit depth
      types of sound channels
         stereo, mono, etc.
      specific compression algorithm which is used
indicate if material can be streamed
indicate if material is seekable
aspect ratio
interlaced vs, progressive scan
black and white or color
5. Media Description information
Abract describing the content in detail
   summary typically at least one full sentence and preferably a full paragraph of information about the content.
keywords describing the content, up to 100
time period
style
category
genre
MPAA rating
   G, PG, R, X, etc.
Internet rating
   G, PG, R, X, etc.
indication if media file contains closed caption information
   can be within media file, within mediaX, or not available
   closed caption list is in mediaX if not in media file
   closed caption format is [text, timecode] pairs in ASCII
indication if music file contains lyric information
   can be within media file, within media X, or not available
   lyrics are included in mediaX if not in media file
   lyric format is [text, timecode] pairs in ASCII
indication if media file contains cue-point information
   can be within media file, within mediaX, or not available
   cue-points are included in mediaX if not in media file
   cue-point format is [text, timecode] pairs in ASCII
   cue points are text strings describing a time period in a media file
indication if media file contains embedded URL information
   can be within media file, within mediaX, or not available
   embedded URLs are included in mediaX if not in media file
   embedded URL format is [text, timecode] pairs in ASCII
   embedded URL format is [text, XYZ] pairs in ASCII
   embedded URLs are text strings describing a time period in a media file
media user data
   arbitrary number of fields of arbitrary length
6. Media Content Attributes
indication that content is music
   indication of single value or list of time periods with associated scalars
   if single, then scalar percentage from 0 to 100, 100 is max
   it list, then list of [time, scalar]
indication that content is speech/sound effects
   indication of single value or list of time periods with associated scalars
   if single, scalar percentage from 0 to 100, 100 is max
   if list, then list of [time, scalar]
indication of volume level
   indication of single value or list of time periods with associated scalars
   if single, scalar value from 0 to 100, 100 is max
   if list, then list of [time, scalar]
degree of motion
   indication of single value or list of time periods with associated scalars
   if single, scalar value from 0 to 100, 100 is max
   if list, then list of [time, scalar]
degree of brightness
   indication of single value or list of time periods with associated scalars if single, scalar value from 0 to 100, 100 is max
if list, then list of [time, scalar]
degree of contrast
   indication of single value or list of time periods with associated scalars
   if single, scalar value from 0 to 100, 100 is max
   if list, then list of [time, scalar]
degree of chrominance
   indication of single value or list of time periods with associated scalars
   if single, scalar value from 0 to 100, 100 is max
   note that 0 is black and white
   if list, then list of [time, scalar]
average RGB color
   indication of single value or list of time periods with associated scalars
   if single, scalar value from 0 to 100, 100 is max
   one scalar value per channel of color
   if list, then list of [time, scalar]
7. Media Location
multimedia file reference (i.e., ftp:name.movie or http://name.movie)
8. Media Previews
key frame index
compressed frame index
preview image for digital video clips [optional]
   location of preview image as offset from file start
   target image resolution for preview image
      width and height
filmstrip for digital video clips [optional]
   location of filmstrip images as offset from file start
   target image resolution for filmstrip
      width and height
motion preview for digital video clips [optional]
   location of start and end frames from file start
   target image resolution for motion preview
      width and height
9. Media Commerce
indication if multimedia data is for sale electronically
   if for sale, which payment mechanism
      Cybercash, First Virtual, Digicash, etc.
   if for sale, the price of the content can be stored in the index
      price in dollars and cents
   if for sale, indicate usage model
      pay to download full version
      pay to license the content for re-use at a web site
10. Media Editing and Creation
date of multimedia file creation
   TIME DAY MONTH YEAR", in ASCII, such as "00:00:00 PDT XX Y ZZZZ
date of multimedia file encoding
   TIME DAY MONTH YEAR", in ASCII, such as "00:00:00 PDT XX Y ZZZZ
date of last modification to multimedia file
   TIME DAY MONTH YEAR", in ASCII, such as "00:00:00 PDT XX Y ZZZZ
edit history
11. Media Playback
name of software tools required to playback/display the content
   i.e., for QuickTime use "MoviePlayer", etc.
   URL to obtain the multimedia file player
12. Media Size, Time and Speed
data size (in bytes) of the multimedia file
data rate (in bytes/sec) of the multimedia file required for playback
   date rate (in bytes/sec) required for playback for each track
duration of material (hours, minutes, seconds, tenths of seconds)
   00:00:00:00
download time for different speed connections
13. Media Contact Information
domain name where the multimedia file resides
name of the web page where the multimedia file resides
e-mail address for the web site where the multimedia file resides
address and phone number associated with multimedia file, if available

ALTERNATIVES TO THE PREFERRED EMBODIMENT OF THE PRESENT INVENTION

There are, of course, alternatives to the described embodiment which are within the reach of one of ordinary skill in the relevant art. The present invention is intended to be limited only by the claims presented below.

What is claimed is:

1. A computer implemented method of indexing media comprising:
   a) the computer examining HTML to locate media;
   b) the computer locating lexical information near the media in the HTML;
   c) the computer generating an index for later use in retrieval of the media, the index including the lexical information and information based on the content of the media;
   d) the computer weighting the index;
   e) computing an aspect ratio A;
   f) determining a target height IH of a preview image from the media as the preview height FH less the height of any top and bottom border;
   g) determining a target width IW of said preview image as a function of said target height IH and said aspect ratio A.

2. The method as recited by claim 1 the step of locating media comprising the steps of:
   a) locating an HTML page and scanning said page for predetermined HTML tags;
   b) for each HTML object, determining if there is a media URL.

3. The method as recited by claim 2 wherein said step of locating lexical information comprises the steps of:
   a) identifying relevant text from the HTML; and
   b) examining the said media object for lexical information.

4. The method as recited by claim 3 wherein said step of identifying relevant text from the HTML comprises:
   a) if said media URL is in a table, using text from the associated table element;
   b) if said media URL is in a list, using text from the associated list element;
   c) using text from headings associated with said media.

5. The method as recited by claim 3 wherein said step of examining the media object for text comprises, in the case of a downloadable media file, examining the media file header for textual information and examining the media file content for media information.

6. The method as recited by claim 5 wherein said step of examining the media file content for media information comprising examining for closed captioning text.

7. The method as recited by claim 3 wherein said step of examining the media object for text comprises, in the case of a streaming media file, streaming the media file and examining the streaming media for text.

8. The method as recited by claim 1 wherein said step of weighting the index comprises weighting based on a set of predetermined weighting values.

9. The method as recited by claim 8 wherein predetermined values are set for:
   a) text in the URL of the media file;
   b) text embedded in the media file;
   c) text annotations in the media file; and
   d) script dialogue, lyrics and closed captioning in the media file.

10. The method as recited by claim 9 further comprising the step of computing the number of images for display as the preview width divided by the sum of the target width IW and any spacing between images.

11. The method as recited by claim 8 wherein said step of selecting images from said media object comprises the steps of:
   a) decompressing frames of said media object at N points wherein N is determined based on the size of said preview and the size of images to be displayed in said preview;
   b) analyzing each of said frames to determine if said frames meet predetermined criteria and if said frames do meet said predetermined criteria, selecting said frame for display;
   c) if one of said frames do not meet said predetermined criteria, selecting a substitute frame.

12. The method as recited by claim 11 wherein said previews comprise information allowing display and feedback of information at predetermined locations.

13. The method as recited by claim 11 wherein said preview comprises snippets of audio information.

14. A method of providing access to media content stored on a network comprising the steps of:
   a) crawling and indexing said network for media content
   b) said step of indexing said network including examining context and content of media objects by:
      (i) examining HTML lexical information surrounding said media object and storing selected lexical information for indexing; and
      (ii) examining said media object for lexical information and non-lexical information, the non-lexical information comprising brightness, contrast and color, and storing said lexical and non-lexical information for indexing; and
   c) building previews of said media objects for retrieval.

15. A method of providing access to media content stored on a network comprising the steps of:
   a) crawling and indexing said network for media content;
   c) said step of indexing said network including examining context and content of media objects by:
      (i) examining HTML lexical information surrounding said media object and storing selected lexical information for indexing, and
      (ii) examining said media object for lexical information and non-lexical information, the non-lexical information comprising motion and chrominance, and storing said lexical and non-lexical information for indexing; and
   c) building previews of said media objects for retrieval.

* * * * *

UNITED STATES PATENT AND TRADEMARK OFFICE
CERTIFICATE OF CORRECTION

PATENT NO. : 5,903,892
DATED : May 11, 1999
INVENTOR(S) : Hoffert, et al.

It is certified that error appears in the above-identified patent and that said Letters Patent is hereby corrected as shown below:

In the title page at [54] delete "INDEXING OF MEDIA CONTENT ON A NETWORK" and insert --INDEXING MEDIA CONTENT ON THE INTERNET--; and col. 1--

In column 3 at line 18 delete "Indexina" and insert --Indexing--

Signed and Sealed this

Eighth Day of February, 2000

*Attest:*

Q. TODD DICKINSON

*Attesting Officer*     *Commissioner of Patents and Trademarks*